US 7,864,878 B2

(12) United States Patent
Capozio

(10) Patent No.: US 7,864,878 B2
(45) Date of Patent: Jan. 4, 2011

(54) METHOD FOR RECEIVING AN OFDM SIGNAL

(75) Inventor: Piergiorgio Capozio, Milan (IT)

(73) Assignee: ST-Ericsson SA, Geneva (CH)

( * ) Notice: Subject to any disclaimer, the term of this patent is extended or adjusted under 35 U.S.C. 154(b) by 1495 days.

(21) Appl. No.: 11/197,241

(22) Filed: Aug. 4, 2005

(65) Prior Publication Data

US 2006/0029150 A1    Feb. 9, 2006

(30) Foreign Application Priority Data

Aug. 5, 2004    (EP)    ................................. 04425612

(51) Int. Cl.
*H03C 5/00* (2006.01)
*H03H 7/30* (2006.01)
*H04B 1/00* (2006.01)

(52) U.S. Cl. .......................... 375/269; 375/229; 455/68

(58) Field of Classification Search ................ 375/260, 375/269, 229, 324; 455/68
See application file for complete search history.

(56) References Cited

U.S. PATENT DOCUMENTS

| 7,139,320 | B1 * | 11/2006 | Singh et al. | 375/260 |
| 7,184,714 | B1 * | 2/2007 | Kutagulla et al. | 455/73 |
| 2003/0112898 | A1 * | 6/2003 | Song et al. | 375/324 |
| 2003/0123534 | A1 * | 7/2003 | Tsui et al. | 375/229 |
| 2004/0066861 | A1 * | 4/2004 | Song et al. | 375/316 |
| 2004/0170228 | A1 * | 9/2004 | Vadde | 375/260 |
| 2004/0203472 | A1 * | 10/2004 | Chien | 455/68 |
| 2004/0224715 | A1 * | 11/2004 | Rosenlof et al. | 455/522 |
| 2005/0047517 | A1 * | 3/2005 | Georgios et al. | 375/267 |
| 2005/0152466 | A1 * | 7/2005 | Maltsev et al. | 375/260 |
| 2005/0260949 | A1 * | 11/2005 | Kiss et al. | 455/67.14 |
| 2006/0056554 | A1 * | 3/2006 | Lin et al. | 375/350 |

FOREIGN PATENT DOCUMENTS

WO    03 101 064    12/2003

OTHER PUBLICATIONS

Tubbax, J.; Come, B.; Van der Perre, L.; Donnay, S.; Engels, M.; Moonen, M.; De Man, H.;☐☐Radio and Wireless Conference, 2003. RAWCON '03. Proceedings☐☐Jan. 2004, pp. 283-292☐☐.*
Simoens et. al., "New I/Q Imbalanace Modeing and Compensation in OFDM Systems with Frequency Offset", 13th IEEE Int'l Symposium on Personal Indoor and Mobile Radio Communications; vol. 2, Sep. 15, 2002; pg. 561-566.*

(Continued)

*Primary Examiner*—Mohammad H Ghayour
*Assistant Examiner*—Sarah Hassan
(74) *Attorney, Agent, or Firm*—Lisa K. Jorgenson; Allen, Dyer, Doppelt, Milbrath & Gilchrist, P.A.

(57) ABSTRACT

The method is for receiving an OFDM signal according to which, during a frequency translation phase, there is introduced a phase and gain imbalance between the phase and quadrature components thereof, and a frequency offset relative to a main carrier of the OFDM signal. The method involves a compensation of the effects of the imbalance even in the presence of the frequency offset and provides a reference signal indicative of the effect of the imbalance and according to which a process is carried out to reduce the effect of the imbalance itself.

29 Claims, 8 Drawing Sheets

OTHER PUBLICATIONS

Tubbax et al., "Joint Compensation of IQ Imbalance, Frequency Offset and Phase Noise in OFDM Receivers", Telecommunications Eurel Publication, Milano, Italy; vol. 15, No. 3, May 2004, p. 283-292, XP-001199013.

Tubbax et al., "Joint Compensation of IQ Imbalance, Frequency Offset in OFDM Systems", Globecom 2003—IEEE Global; Telecommunications Conference, San Francisco, Dec. 1-5, 2003; vol. 7 of 7; p. 2365-2369; XP010677778.

Simoens et al., "New I/Q Imbalance Modeling and Compensation in OFDM Systems with Frequency Offset", $13^{th}$ IEEE Int'l Symposium on Personal Indoor and Mobile Radio Communications; vol. 2, Sep. 15, 2002; p. 561-566; XP010614288.

Xing et al., "Frequency Offset and I/Q Imbalance Compensation for OFDM Direct-Conversion Receivers", IEEE Int'l Conference on Acoustics, Speech and Signal, New York, N.Y.; vol. 1 of 6; Apr. 6, 2003; p. IV-708-IV-711; XP010641258.

Sathananthan et al., "A Novel ICI Cancellation Scheme to Reduce both Frequency Offset and IQ Imbalance Effects in OFDM", $9^{th}$ Int'l Symposium on Computers and Communications (IEEE Cat. No. $04^{th}8769$), IEEE Piscataway, NJ, USA; Jun. 28, 2004; vol. 2, p. 708-713; XP-002312664.

* cited by examiner

METHOD FOR RECEIVING AN OFDM SIGNAL

FIELD OF THE INVENTION

The present invention relates to the field of Orthogonal Frequency Division Multiplexing (OFDM) communication systems. More particularly, the present invention relates to the reception of OFDM signals.

BACKGROUND OF THE INVENTION

The OFDM technique is known to transmit digital signals at a high transmission speed (bit rate). The OFDM technique is of the multicarrier type in that the signal to be transmitted is divided into several lower speed channels, each one being transmitted on a distinct subcarrier. The subcarrier frequencies are selected such as to be mutually orthogonal to enable the separation by the receiver of the signals by which they are modulated. The OFDM symbol comprises a set of symbols modulating corresponding subcarriers and is obtained by carrying out an Inverse Discrete Fourier Transform, particularly an Inverse Fast Fourier Transform (IFFT), of a set of input symbols.

The signal resulting from applying the IFFT, after other processing (such as parallel to serial, digital to analog conversions and a low-pass filtering operation) is subjected to a radiofrequency translation in a suitable mixer and, finally, a dispatch (for example, irradiation via an antenna for wireless communication) along the transmission channel.

The main processing of the received OFDM signal is well known to those skilled in the art. Briefly, the OFDM receiver carries out the following operations: a low-frequency translation of the OFDM received, an analog to digital conversion followed by a serial to parallel conversion and a Discrete Fourier Transform (DFT) (being typically carried out by Fast Fourier Transform technique, FFT). The DFT (by transforming the signals from the time to the frequency domain) carries out the demodulation of the OFDM signal thus allowing to obtain the digital signals carrying the symbols relative to each of the subcarriers on several outputs.

The output digital signal from DFT is thus subjected to an equalization (intended to eliminate the effects of the transmission channel) and is sent to an estimator which evaluates the symbol received. The low-frequency translation carried out by the receiver provides the generation by a local oscillator of two signals being ideally of equal amplitude and in quadrature to each other, to be combined with the OFDM signal received thus producing phase I and quadrature Q components.

Practically, the local oscillator (which should operate with a frequency equal to that of the signal transmitted and hence received) generates-two signals that have not the same amplitude and are not in quadrature to each other, i.e. the local oscillator exhibits the undesired phenomenon known as the phase and gain imbalance (or amplitude). This imbalance affects the frequency translated signal and then transformed by the DFT thereby leading to an interfering term appearing between the subcarriers which, by being added to the useful signal, can hinder the evaluation of the symbol carried out by the estimator.

The article "A Novel IQ Imbalance Compensation Scheme For The Reception of OFDM Signals" di A. Schuchert, R. Hasholzner e P. Antoine—IEEE Transactions on Consumer Electronics, Vol. 47, No. 3—August 2001 (pages 313-3.18), describes a diagram of an OFDM receiver which carries out a filtration aiming at compensating the effects of the imbalance. This article provides an imbalance compensation based on the use of a FIR filter (Finite Impulsive Response) operating on the signals in the frequency domain (i.e. on those signals resulting from the DFT) according to coefficients which are adapted to the received signal variations. The initial value of these coefficients is set during a training transmission phase employing pilot subcarriers.

It has been observed that the conventional means for compensating the phase and gain imbalance in OFDM receivers, such as that referred to in the above article, do not allow a satisfactory operation. More specifically, it has been noted that the conventional techniques carrying out the compensation by using frequency domain signals do not ensure that the interference term related to the imbalance is satisfactorily eliminated.

Particularly, it is noted that these drawbacks in the art are also related to the presence of an offset between the operating frequency of the local oscillator and the frequency of the radiofrequency carrier of the received signal. It should be noted that the method of the above mentioned article by A. Schuschert et al. does not take the presence of such offset into account, therefore it reflects a non realistic situation.

SUMMARY OF THE INVENTION

An object of the present invention is to provide a method and receiver for receiving OFDM signals while overcoming the above drawbacks of the prior, such as those relating to the compensation of the imbalance in the presence of frequency offset.

Objects of the present invention is achieved by a method for receiving an OFDM signal according to which, during a frequency translation phase, there is introduced a phase and gain imbalance between the phase and quadrature components thereof, and a frequency offset relative to a main carrier of the OFDM signal. The method involves a compensation of the effects of the imbalance even in the presence of the frequency offset and provides a reference signal indicative of the effect of the imbalance and according to which a process is carried out to reduce the effect of the imbalance itself The present invention also provides a receiver and a OFDM signal transmission system to implement the method.

BRIEF DESCRIPTION OF THE DRAWINGS

To better-understand the invention and appreciate the advantages thereof, several embodiments are described below by way of non limiting examples, with reference to the annexed drawings in which.

DETAILED DESCRIPTION OF THE PREFERRED EMBODIMENTS

Figure 1:
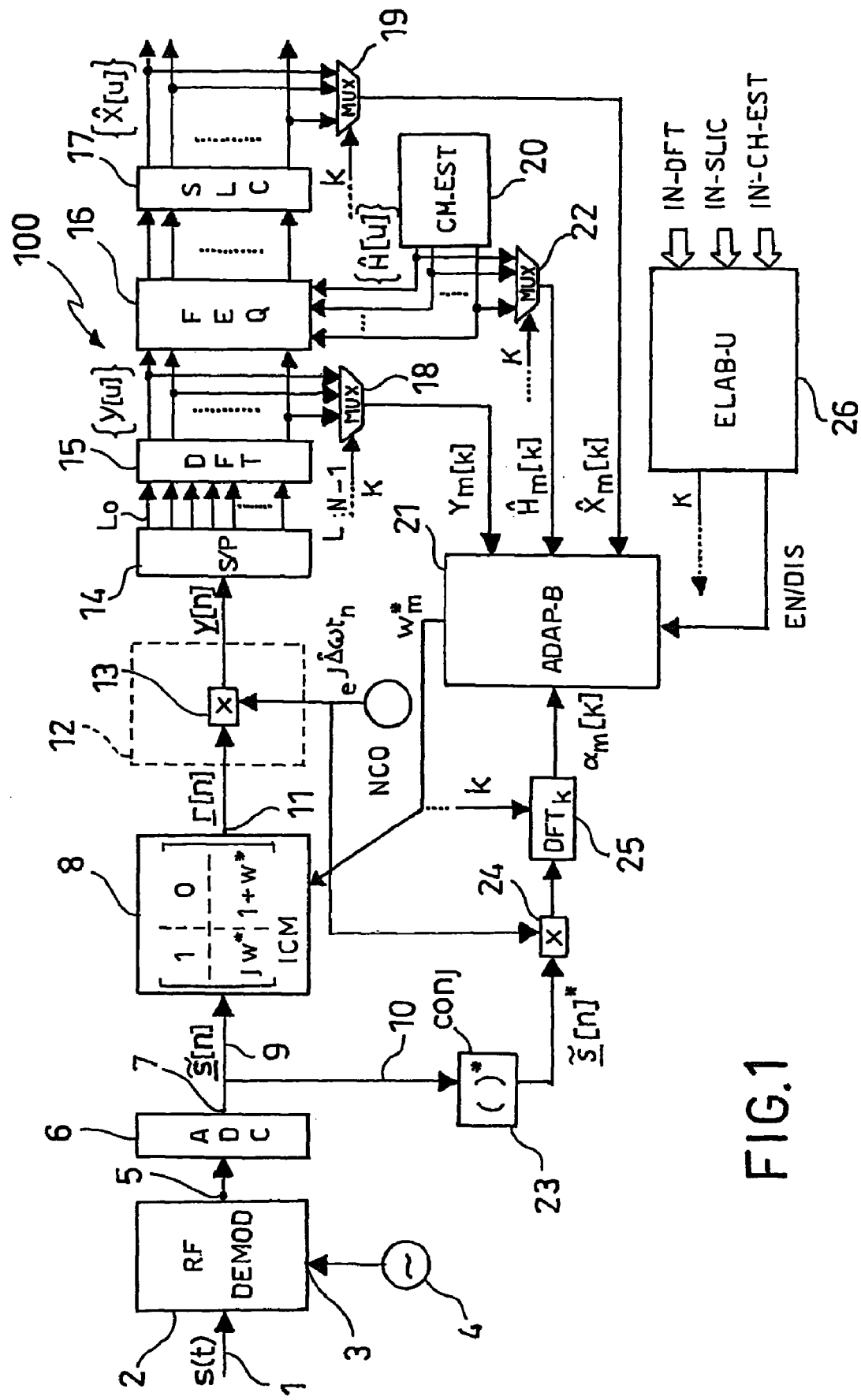
FIG. 1 is a block diagram illustrating a receiver according to an embodiment of the present invention.

Reference should be made to FIG. 1 where a receiver 100 in accordance with an embodiment of the present invention is schematically illustrated with functional blocks. It should be noted that the blocks indicated in FIG. 1 can substantially correspond to hardware blocks or, alternatively, some of them are indicative of transformations and processing carried out by suitable software which can be implemented either in a dedicated processor or a general purpose processor, i.e. suitable to perform also different functions. In the particular case of wireless transmission, the approach providing hardware blocks, i.e. circuit blocks (for example, integrated circuit boards) is to be preferred, and will be referred to throughout the present description.

The receiver 100 is advantageously suitable to receive OFDM signals and is provided with a first terminal or input port 1 for a received signal s(t) (of the OFDM type) connected to a demodulator 2 (RF-DEMOD) for the low-frequency conversion (or translation) of the received radio frequency signal s(t), being provided with a second input port 3 for a sinusoid signal that can be generated by a local oscillator 4. As will be described in detail in the operating method of the receiver 100, the radio frequency demodulator 2, by using the signal provided by the local oscillator 4, is such to generate two sinusoid signals having a phase and/or gain imbalance and having an offset in $\Delta f$ frequency (being reported below, also in terms of pulse $\Delta\omega$) relative to the radio frequency carrier of the received signal s(t).

A first output port 5 of the local demodulator 2 is connected to an analog-to-digital conversion block 6 (ADC) provided with an output 7 being in turn connected to a first connecting branch 9 leading to a block 8 representative of an imbalance compensation matrix ICM and a second connecting branch 10. As will be described in detail below, the imbalance compensation block 8 is such to carry out a transformation of the signal resulting from the demodulator 2 to remove the effects of the phase and/or gain imbalance. Particularly, this compensation block 8 carries out a linear combination of the incoming signal according to a suitably evaluated $w^*_m$ coefficient, and can be provided for example via a circuit network of a type similar to a FIR filter (Finite Response Filter). The $w_m$ coefficient is a complex number and the symbol "*" indicates the operation of conjugated complex.

The imbalance compensation block 8 has a second output port 11 being connected to a block 12 compensating the frequency offset existing between the received signal carrier frequency s(t) and the local oscillator frequency 4. The block 12 compensating the frequency offset includes a multiplexer 13 receiving a signal generated by a numeric control oscillator NCO.

A third output port of the offset compensation block 12 (corresponding to one output of the multiplexer 13) is connected to a serial-to-parallel conversion stage 14 (S/P) having a plurality of output lines $L_0$-$L_{N-1}$ entering an OFDM demodulator 15 made with a stage 16 of discrete Fourier transformation (DFT). The serial-to-parallel conversion stage 14 also comprises a block (not shown) carrying out the removal of the cyclic prefix CP according to methods known by those skilled in the art.

Advantageously, the discrete Fourier transform being associated to block 15 is obtained by a conventional fast Fourier transform, FFT. The DFT block, 15, allows to transform the time-domain signals being present at the input thereof, by providing corresponding signals {Y[u]} in the frequency domain on respective outputs.

Advantageously, the receiver 100 is provided by a channel estimate block 20 (CH-EST) being such as to carry out an estimate of the transmission channel transfer function for the sub-carriers of the OFDM signal. This channel estimate block 20 operates in a conventional manner, for example, this estimate is carried out in a training phase where the transmitter (not shown in FIG. 1) sends an OFDM signal of which the symbols being carried by the signals are known to the receiver 100. As will be understood by those skilled in the art, based on the symbol, whether actually received and sent, it is possible to go back to the channel transfer function.

The channel estimate block 20 provides, on the outputs thereof, signals representative of the channel transfer functions per each signal sub-carrier s(t). These outputs of the channel estimate block 20 are connected to an equalizer 16 (FEQ, Frequency-Domain Equalizer) which, by being connected to the outputs of the DFT block 15, operates in the frequency domain. The equalizer 16 can be manufactured according to conventional techniques and has the task of eliminating the effect due to the transmission channel from the frequency domain signal outgoing from block 15 evaluating the DFT.

To the outputs of equalizer 16 there is connected a estimator stage 17 (SLC, acronym for "Slicer"), known per se, which takes the decision relative to the symbols received { $\hat{X}[u]$}, for example, according to a maximum likelihood principle. The output lines of block 15 (DFT), estimator 17, channel estimate block 20 are connected to corresponding multiplexer MUX designated with numerals 18, 19 and 22, respectively. These multiplexers 18, 19 and 22 are capable of selecting a single output of the block to which they are connected (block 15, 17 or 20) corresponding to a $k^{th}$ subcarrier the value (0 to N−1) of which is selected from another block of the receiver 100. In other words, the multiplexers 18, 19 and 22 select only one of the outputs of the block to which they are connected such as to provide them to other processing stages of receiver 100.

it should be observed that the second connecting branch 10 (the one connected to the output 7 of the analog-to-digital converter 6) includes transformation blocks (being designated with numerals 23, 24 and 25) enabling to obtain a signal $\alpha_m[k]$ indicative of the noise (or distortion) due to the imbalance, the function of which will be described below.

The receiver 100 is provided with an evaluation and adaptation block 21 (ADAP-B) having the function of computing and adapting, i.e. changing, at least one characteristic of the imbalance compensation block 8 upon change of the received signal s(t), such as to carry out a substantial compensation of the imbalance itself. Particularly, the adaptation block 21 is such as to provide the compensation block 8 with an initial value of coefficient $w^*_m$ and will thereafter change this value such as to optimize the compensation upon change of some characteristics of the signal received s(t).

Advantageously, the adaptation block 21 is such as to carry out the adaptation of the compensation at least based on said signal $\alpha_m[k]$ related to the frequency offset, and therefore, it is connected to the block 25 of second branch 10 to receive said signal $\alpha_m[k]$. Preferably, the adaptation block 8 also operates based on the following signals being selected from multiplexers 18, 19 and 22:

A demodulated signal $Y_m[k]$ relative to the $k^{th}$ subcarrier on output from block 15 (DFT);

a signal $\hat{H}_m[k]$ being representative of the channel estimated for the $k^{th}$ subcarrier; and a signal $\hat{X}_m[k]$ being representative of symbol estimated for the $k^{th}$ subcarrier.

A receiver 100 further includes a processing unit 26 (ELAB-U) carrying out at least one data processing relative to the selection of a strategy of imbalance compensation adaptation. Particularly, on an EN/DIS output, the processing unit 26 can send a signal enabling/disabling any change in the current value of compensation coefficient $w^*_m$ by the adaptation block 21.

Advantageously, the processing unit 26 also carries out processing concerning the selection of the $k^{th}$ subcarrier and provides on one output (being designed with "k" in FIG. 1) a corresponding signal to be sent to the multiplexers 18, 19 and 20 and to block 25. The processing unit 26 operates based on signals coming from block 15 of DFT evaluation (being supplied to IN-DFT inputs), signals coming from the estimator 17 (being supplied to IN-SLIC inputs) and signals coming from the channel evaluation block 20 (being supplied to IN-CH-EST inputs).

Figure 2:
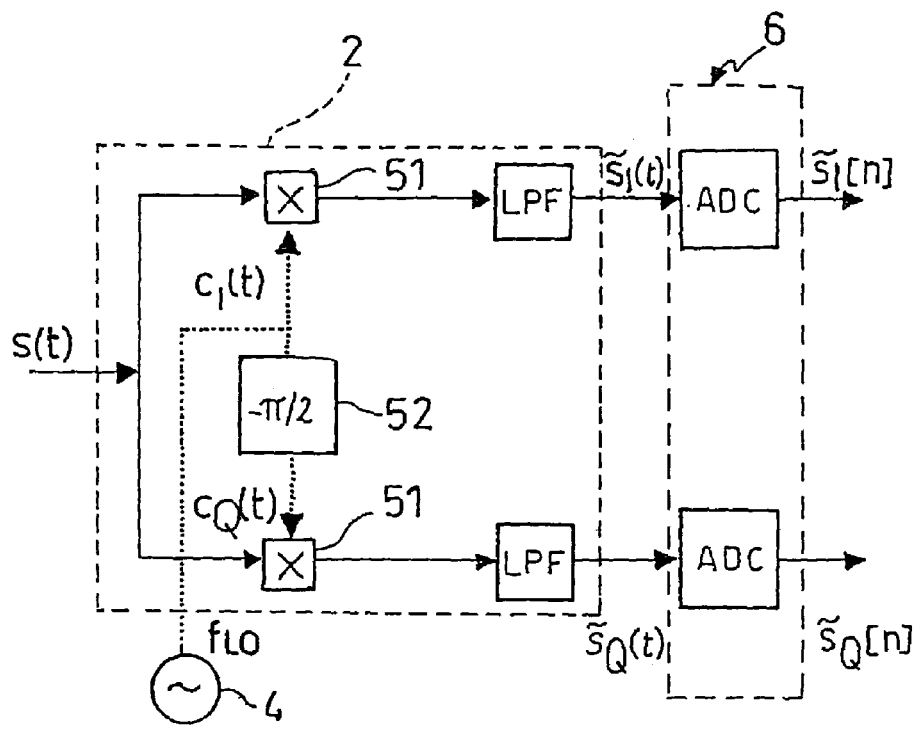
FIG. 2 is a schematic diagram illustrating an exemplary radio frequency demodulator to be used with the receiver of FIG. 1.

FIG. 2 schematically illustrates the inner architecture of an exemplary radio frequency demodulator 2 of the conventional type, which comprises a branch for the phase component and one for the one in quadrature being provided with multiplexers 51 (one of which being connected to a phase shifter 52) and two low-pass filters LPF. The respective outputs of the low-pass filters are connected to two analog-to-digital conversion devices ADC being part of the converter 6.

Figure 3:
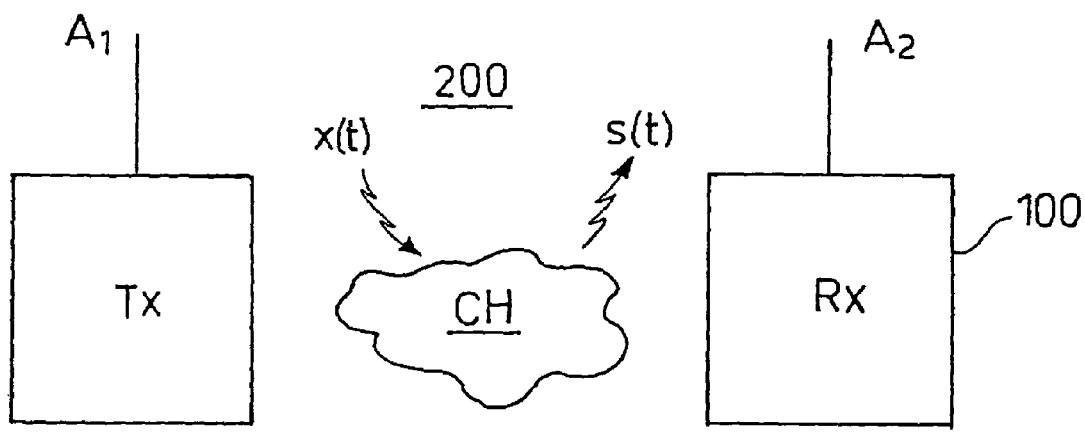
FIG. 3 is a schematic diagram illustrating a wireless transmission system in accordance with the present invention.

In FIG. 3 there is illustrated, in a very schematic manner, an exemplary OFDM wireless communication system 200 and including a transmitter Tx (not described in detail) being provided with at least one transmission antenna A1, and the receiver 100 (Rx) described above, being provided with a receiving antenna A2 connected to the first input port 1 of the receiver 100 itself. Between the transmitter Tx and the receiver 100 there is provided a transmission channel CH, such as a radio channel.

The communication system 200 can be either a packet transmission system (for example, Wireless-LAN IEEE 802.11a standard or ETSI-HIPERLAN/2 standard) or rather a non-packet system (information continuous transmission) such as in the exemplary case of Digital Video Broadcasting or Digital Audio Broadcasting standards. The transmitter Tx is capable of generating a signal x(t) of the OFDM type the complex envelope of which can be expressed, in baseband (i.e. before the radio frequency translation), as follows:

$$\underline{x}(t) = \sum_{m=-\infty}^{m=+\infty} \underline{x}_m(t)$$

$$= \sum_{m=-\infty}^{m=+\infty} \frac{1}{N} \sum_{k=-N/2}^{\frac{N}{2}-1} X_m[k] e^{j\frac{2\pi}{T}k(t-mT_{symb})} \cdot \kappa(t + T_{cp} - mT_{symb})$$

The envelope signal $\underline{x}(t)$ is a sum of symbols $\underline{x}_m(t)$.

As will be understood by those skilled in the art, the following symbols are employed in the above expression:

m: OFDM symbol index;

k: subcarrier index;

$\underline{x}_m(t)$: the expression of the complex envelope of the signal relative to the generic $m^{th}$ OFDM symbol, TCp: duration of the cyclic prefix, T: duration of the OFDM symbol "body", Tsymb: overall duration of an OFDM symbol. It is equal to the sum of the cyclic prefix time $T_{cp}$ and the time relative to the symbol "body" T, Xm[k]: constellation point transmitted during the $m^{th}$ OFDM symbol on the $k^{th}$ subcarrier.

Generally, it should be observed that in the following of the present description the complex envelopes (analytic signals) of a generic real signal p(t) are represented with the same letter as the real signal but being underlined: p(t) is the complex envelope of the signal p(t).

Finally, κ(t) represents a "window" function, meaning that it takes the value of 1 (one) when being within a defined time interval and 0 (zero) outside thereof. The analytic representation of κ(t) is:

$$\kappa(t) = \begin{cases} 1 & 0 \leq t \leq T_{cp} + T \\ 0 & \text{elsewhere} \end{cases}$$

As is well known to those skilled in the art, the cyclic prefix is inserted by the transmitter Tx during a phase known as Cyclic Prefix Insertion. By using the cyclic prefix with OFDM systems, the so-called "multipath" phenomenon (being caused by multiple reflections), which is inherently due to the radio channel CH, can be countered.

Being the cyclic prefix a redundant part of the transmitted signal, the receiver 100 will provide to remove it (Cyclic Prefix Removal) in the course of the receiving process. In the description of the receiver 100 and the functioning thereof, the cyclic prefix removal phase being carried out by the serial-to-parallel conversion stage 14, is not described in detail because it can be carried out by conventional techniques.

A radio frequency conversion stage being provided in the transmitter Tx by operating on the complex envelope signal $\underline{x}(t)$ associates it to a radio frequency carrier (with $\omega_0$ pulse) thereby giving the following signal x(t), transmitted by means of the antenna A1:

$$x(t) = \cos(\omega_0 t) \cdot \text{Real}\{\underline{x}(t)\} - \sin(\omega_0 t) \cdot \text{Imag}\{\underline{x}(t)\} \cos(\omega_0 t) \cdot x_1(t) - \sin(\omega_0 t) \cdot x_Q(t)$$

It should be observed that each subcarrier of the signal x(t) is modulated according to the M-QAM (M-Quadrature Amplitude Modulation) technique, though other modulation types may nevertheless be used, such as the PSK (Phase Shift Keying) modulation.

The problems at the heart of the present invention and the operating phases of the functioning method of receiver 100 and system 200 will be now described.

The Received Signal s(t).

At the first input port 1 of receiver 100 there is provided a radio frequency received signal s(t). The received signal s(t) corresponds to the transmitted signal x(t) along channel CH and hence it conveys an OFDM signal, and consists of the phase low-frequency component $s_I(t)$ and the quadrature low-frequency component $s_Q(t)$ with radio frequency carrier having a $\omega_0$ pulse, such as indicated in the following relationship:

$$s(t) = s_I(t) \cdot \cos(\omega_0 t) - s_Q(t) \cdot \sin(\omega_0 t) \quad (1)$$

The received signal s(t) can be also represented by the complex envelope thereof $\underline{s}(t) = s_I(t) + js_Q(t)$. The expression for the generic OFDM symbol being conveyed by the complex envelope is:

$$s(t) = s(t) \quad (a)$$

$$= \frac{1}{N} \sum_{u=-N/2}^{\frac{N}{2}-1} H[u] \cdot X[u] e^{j2\pi(u\Delta f_c)t}$$

$$= \frac{1}{N} \sum_{u=-N/2}^{\frac{N}{2}-1} Z[u] e^{j2\pi(u\Delta f_c)t}$$

$$0 \leq t \leq T$$

Wherein:
- $H[u]$: is the frequency response of the transmission channel on the $u^{th}$ subcarrier;
- $X[u]$ is the constellation point M-QAM being transmitted on the same subcarrier,
- $\Delta f_c = 1/T$ is the spacing between the subcarriers (e.g., 312.5 kHz with IEEE 802.11a or Hiperlan2); the quantity T has already been defined;
- $Z[u] = [u]X[u]$ Frequency Translation and Analog-to-Digital Conversion Phases (Blocks 2 and 6). Introduction of the Phase and/or Gain Imbalance and Frequency Offset by Block 2.

The received signal s(t) is then supplied to the port 1 of radio frequency demodulator 2 (see FIG. 2). The local oscillator 4 (of $f_{LO}$ frequency or $\omega_{LO}$ pulse) supplies a phase sinusoidal signal $C_I(t)$ to the respective multiplexers 51, and a sinusoidal signal in quadrature $c_Q(t)$ by means of the −90° phase shifting being-introduced by the phase shifter 52. The phase and in quadratura $c_I(t)$ and $c_Q(t)$ local signals are generated, because of construction limits, with a relative gain $\epsilon$ and phase $\Delta\phi$ difference compared to 90°. Furthermore, the frequency synthesized by the local oscillator 4 is not exactly the same as the one corresponding to the pulse $\omega_0$ of the carrier of the received signal s(t) and will differ from it by an amount $\Delta\omega$. Therefore, the phase $c_I(t)$ and in quadrature $c_Q(t)$ local signals can be represented as follows:

$$\begin{cases} c_I(t) = 2(1-\varepsilon)\cos((\omega_0 + \Delta\omega)t - \Delta\phi) \\ c_Q(t) = -2(1+\varepsilon)\sin((\omega_0 + \Delta\omega)t + \Delta\phi) \end{cases} \quad (2)$$

The low-pass filters LPF of the radio frequency demodulator 2 filter the double frequencies formed in the multiplication of the local signals $c_I(t)$ and $c_Q(t)$ with the received signal s(t) which is carried out by means of the multipliers 51. At the respective outputs of the low-pass filters LPF there are present the phase $\tilde{s}_I(t)$ and in quadrature $\tilde{s}_Q(t)$ low frequency components, which are affected by the gain $\epsilon$ and phase $\Delta\phi$ errors or imbalances and by the frequency error or offset $\Delta\omega$.

$$\begin{cases} \tilde{s}_I(t) = (1-\varepsilon) \cdot \{s_I(t) \cdot \cos(\Delta\omega t - \Delta\phi) + s_Q(t) \cdot \sin(\Delta\omega t - \Delta\phi)\} \\ \tilde{s}_Q(t) = (1+\varepsilon) \cdot \{-s_I(t) \cdot \sin(\Delta\omega t + \Delta\phi) + s_Q(t) \cdot \cos(\Delta\omega t + \Delta\phi)\} \end{cases} \quad (3)$$

The effect of the transformation induced by the radio frequency demodulator 2 on the low frequency components of the received signal s(t) can be also represented in matrix form, as follows:

$$\begin{bmatrix} \tilde{s}_I(t) \\ \tilde{s}_Q(t) \end{bmatrix} = \begin{bmatrix} (1-\varepsilon) & 0 \\ 0 & (1+\varepsilon) \end{bmatrix} \cdot \begin{bmatrix} \cos(\Delta\phi) & -\sin(\Delta\phi) \\ -\sin(\Delta\phi) & \cos(\Delta\phi) \end{bmatrix} \cdot \begin{bmatrix} \cos(\Delta\omega t) & \sin(\Delta\omega t) \\ -\sin(\Delta\omega t) & \cos(\Delta\omega t) \end{bmatrix} \begin{bmatrix} s_I(t) \\ s_Q(t) \end{bmatrix} \quad (4)$$

The low frequency signal (of $\tilde{s}_I(t)$ and $\tilde{s}_Q(t)$ components) on output from the low pass filters LPF is supplied to both converters ADC (included in the analogue-to-digital converter 6) which return phase and in quadrature digital signals ($\tilde{s}_I[n]$ and $\tilde{s}_Q[n]$) of complex envelope signal $\underline{\tilde{s}}[n]$ on parallel lines (indicated in FIG. 1 on the output port 7).

Analysis of the Frequency Offset $\Delta\omega$ Alone

This chapter describes the effect that the frequency offset $\Delta\omega$ (CFO, Carrier-Frequency-Offset) would have on the signal resulting from the frequency translation carried out by the demodulator 2, in the absence of the phase $\Delta\phi$ and gain $\epsilon$ imbalance. As resulting from the expression (4), the presence of a frequency offset $\Delta\omega$ between the transmitter Tx and the local oscillator 4 of the receiver 100 entails the following transformation on the received signal s(t):

$$\begin{bmatrix} s'_I(t) \\ s'_Q(t) \end{bmatrix} = \begin{bmatrix} \cos(\Delta\omega t) & \sin(\Delta\omega t) \\ -\sin(\Delta\omega t) & \cos(\Delta\omega t) \end{bmatrix} \begin{bmatrix} s_I(t) \\ s_Q(t) \end{bmatrix} \Leftrightarrow s'(t) = s(t) \cdot e^{-j\Delta\omega t} \quad (5)$$

Wherein with $s'_I(t)$ and $s'_Q(t)$ there are indicated the low frequency phase and quadrature components, respectively, of the received signal s(t) which has been subjected to the frequency offset effect. Analogously, $\underline{s}'(t)$ is the complex envelope of the signal s(t) consequent to the introduction of the frequency offset.

Furthermore, the offset indicative parameter $\xi$ is defined according to the following relationship:

$$\xi = \frac{\Delta\omega}{2\pi \cdot \Delta f_c}$$

The parameter $\xi$ is equal to the frequency offset normalized to the frequency spacing between the subcarriers. The IEEE 802.11a and ETSI-HIPERLAN/2 standards set a maximum frequency offset value $\Delta f$ equal to 40 ppm (i.e. 40 parts per milion) as evaluated with relation to the RF carrier.

As stated above, for the systems of the above standards the spacing between the subcarriers $\Delta f_c$ is equal to 312.15 kHz and, furthermore, the frequency $f_0$ ($f_0 = \omega_0/2\pi$) of the carrier is approximatively equal to 5 GHz. For such values, it results that the parameter $\xi$ is equal to about 0.64. The Applicant has observed that the value of parameter $\xi$ being equal to 0.64 is such as to compromise the proper demodulation in the absence of a frequency offset compensation.

Analysis of the Gain $\epsilon$ and Phase $\Delta\phi$ Imbalance.

This chapter describes the effect of the gain $\epsilon$ and phase $\Delta\phi$ imbalance on the signal on output from the demodulator 2. The presence of a phase and gain imbalance between the phase and quadrature branches of the radio frequency demodulator 2 entails, as is understood from the relationship (4), the following transformation on the OFDM signal:

$$\begin{bmatrix} \tilde{s}_I(t) \\ \tilde{s}_Q(t) \end{bmatrix} = \begin{bmatrix} (1-\varepsilon) & 0 \\ 0 & (1+\varepsilon) \end{bmatrix} \cdot \begin{bmatrix} \cos(\Delta\phi) & -\sin(\Delta\phi) \\ -\sin(\Delta\phi) & \cos(\Delta\phi) \end{bmatrix} \begin{bmatrix} s'_I(t) \\ s'_Q(t) \end{bmatrix} \Leftrightarrow \tilde{s}(t) = s'(t) \cdot \mu + s'(t)^* \cdot \nu \quad (6)$$

wherein it has been assumed:

$$\begin{vmatrix} \mu = \cos(\Delta\phi) - j \cdot \varepsilon \cdot \sin(\Delta\phi) \\ \nu = -\varepsilon \cdot \cos(\Delta\phi) - j \cdot \sin(\Delta\phi) \end{vmatrix} \quad (7)$$

In the following, the parameters $\mu$ and $\nu$ are defined as the imbalance parameters.

Transformations that would Carry Out the Offset Compensation Block 12 and Blocks 14 and 15, in the Presence of Gain $\varepsilon$ and Phase $\Delta\phi$ Imbalance and Frequency Offset $\Delta\omega$, in the Case of Absence of the Imbalance Compensation Block 8.

For a better understanding of the gain $\varepsilon$ and phase $\Delta\phi$ imbalance and the frequency offset $\Delta\omega$, the form that the signal on output from block 15 of DFT evaluation would take, in the case where the imbalance compensation block 8, being provided by the invention, were not present or inactivated. Above there has been described how the frequency offset, being expressed by parameter $\xi$ is frequently a non-negligible one. Due to the nature of the OFDM signal and the demodulation process thereof, a considerable level of frequency offset compensation is required on the received signal over time, before the latter is processed by means of the DFT of stage 15. Only in case the residual part of the frequency offset, not being compensated over time, is sufficiently small, then a compensation thereof will be possible downstream of DFT (compensation in the frequency domain) by means of an optional further block (not shown in the figures).

The compensation in the time domain is carried out by means of a conventional technique being implemented by the compensation block 12 from FIG. 1, by applying to the sampled time signal of complex envelope $\underline{s}[n]$ a complex sinusoid (rotor) generated by means of the numeric control oscillator NCO with $\hat{\Delta}\omega$ pulse. The $\hat{\Delta}\omega$ pulse of the complex sinusoid is obtained from the offset estimate during a suitable training phase of the received signal.

The transformation carried out on the received signal (when $\hat{\Delta}\omega \cong \Delta\omega$) is $$\underline{y}[n] = \underline{\tilde{s}}[n] \cdot e^{+j\hat{\Delta}\omega t_n} \cong \underline{s}[n] \cdot \mu + \underline{s}[n]^* \cdot e^{+j2\Delta\omega t_n} \cdot \nu \quad (8)$$

It should be observed that in the formula (8) the transformation being introduced by block 12 of frequency offset compensation on the sampled received signal $\underline{\tilde{s}}[n]$ has been expressed (as expressed by the relationship (6)). That is, the transformation induced by the imbalance compensation block 8 shown in FIG. 1 has not been considered. Indeed, in the expression (8) of signal $\underline{y}[n]$ on output from block 12 of offset compensation there are provided the parameters $\mu$ and $\nu$ due to the phase $\Delta\phi$ and gain $\varepsilon$ imbalance.

The samples of the digital signal $\underline{y}[n]$ (expressed by the relation (8)) are sent to the serial-to-parallel conversion stage 14 providing the corresponding samples on N lines $L_0$-$L_{N-1}$. The blocks of N samples are treated by the OFDM demodulator 15 that carries out a discrete Fourier transform (DFT) being implemented, particularly, with the FFT (Fast Fourier Transform) technique. The discrete Fourier transform being carried out by the demodulator block 15 carries out the demodulation of the M-QAM samples.

The signal Y[k] present on the generic $k^{th}$ output of the OFDM demodulator block 15 can be expressed as follows:

$$Y[k] = DFT_k\{\underline{y}[n]\} = \mu \cdot DFT_k\{\underline{s}[n]\} + \nu \cdot DFT_k\{\underline{s}[n]^* \cdot e^{+j2\Delta\omega t_n}\} \quad (9)$$

Wherein $t_n$ is the generic sampling instant.

It should be observed that in the expression (9) the first term corresponds to the useful part of the DFT $k^{th}$ output, whereas the second term designates the interfering part being generated by the presence of the phase and gain imbalance. It should be observed that for the first term of the expression (9) relative to the useful contribution, the offset compensation block 12 has reduced until (ideally) nullifying the frequency offset effect $\Delta\omega$.

As regards the interference contribution, we can rewrite the result as follows:

$$DFT_k\{\underline{s}[n]^* \cdot e^{+j2\Delta\omega t_n}\} = DFT_k\left\{\left(\frac{1}{N}\sum_{u=-N/2}^{\frac{N}{2}-1} Z[u]^* e^{-j\frac{2\pi}{N}un}\right) \cdot e^{+j\frac{2\pi}{N}2\xi n}\right\} \quad (10)$$

$$= \sum_{n=-N/2}^{\frac{N}{2}-1}\left(\frac{1}{N}\sum_{u=-N/2}^{\frac{N}{2}-1} Z[u]^* e^{-j\frac{2\pi}{N}(u-2\xi)n}\right) e^{-j\frac{2\pi}{N}kn}$$

$$= \sum_{u=-N/2}^{\frac{N}{2}-1} Z[u]^*\left(\frac{1}{N}\sum_{n=-N/2}^{\frac{N}{2}-1} e^{-j\frac{2\pi}{N}(u+k-2\xi)n}\right)$$

$$DFT_k\{\underline{s}[n]^* \cdot e^{+j2\Delta\omega t_n}\} = \sum_{u=-N/2}^{\frac{N}{2}-1} Z[u]^*\left(\frac{1}{N}\sum_{n=-N/2}^{\frac{N}{2}-1} e^{-j\frac{2\pi}{N}(u+k-2\xi)n}\right) \quad (11)$$

$$= \sum_{u=-N/2}^{\frac{N}{2}-1} Z[u]^* \cdot \sigma(k, u, \xi)$$

having defined in (11):

$$\sigma(k, u, \xi) = \frac{1}{N}\sum_{n=-N/2}^{\frac{N}{2}-1} e^{-j\frac{2\pi}{N}(u+k-2\xi)n} \quad (12)$$

$$= e^{-j\pi(u+k-2\xi)\left(\frac{1-N}{N}\right)} \cdot \frac{1}{N} \cdot \frac{\sin(\pi(u+k-2\xi))}{\sin\left(\frac{\pi}{N}(u+k-2\xi)\right)}$$

wherein, $\xi = \dfrac{\Delta\omega}{2\pi \cdot \Delta f_c}$.

The relationship (9) can be rewritten as follows:

$$Y[k] = DFT_k\{\underline{y}[n]\} \quad (13)$$

$$= \mu \cdot Z[k] + \nu \cdot \sum_{u=-N/2}^{\frac{N}{2}-1} Z[u]^* \cdot \sigma(k, u, \xi), k = 0 \ldots N-1$$

wherein Z[u] such as defined above is equal to H[u] X[u].

The result is therefore the presence of an intercarrier interference term being determined by the function σ(k,u,ξ) and the imbalance parameter v. This interference function σ(k,u,ξ) has the property of being periodical:

$$\sigma(k,u,\xi)=\sigma(k+1,\text{mod}(u-1, N),\xi) \quad (14)$$

That is, all the interference functions (upon varying k) are obtained by cyclic translation of a base function, such as that corresponding to the k=0 index.

$$\sigma(k,u,\xi)=\sigma(0,\text{mod}(u+k,N),\xi), k=0\ldots N-1 \quad (15)$$

Furthermore, it should be observed that in the (non-realistic) case where the frequency offset Δω is null (ξ=0) the interference function σ(k,u,ξ) would take the form of a Dirac delta, centered in u=N−k:

$$\sigma(k,u,0)=\delta[N-k-u], k=0\ldots N-1 \quad (15')$$

In this non-realistic case, the formula (13) would be as follows:

$$Y[k]=\mu \cdot H[k]X[k]v \cdot H[-k]X[-k]^* \quad (13')$$

wherein the first term represents the useful part and the second term would represent the distorsion part to be eliminated, which is introduced by the symmetric carrier alone.

Ideal Operation of Block 8 of Phase and Gain Imbalance Compensation and Frequency Offset Compensation by Block 12. Transformations Carried Out by Blocks 14, 15, 16 and 17, in the Ideal Case.

As is observed in FIG. 1, the inventive method provides the gain ε and phase Δφ imbalance compensation by directly acting on the received sampled time signal and having complex envelope s̃[n] (i.e., it carries out the compensation in the time domain). Preferably, the compensation carried out by block 8 is a digital processing operation providing, particularly, a suitable linear combination between the received complex envelope s̃[n] and the conjugated complex version thereof s̃[n]*. According to the example described, the linear combination being provided uses only the explicit coefficient w (the other coefficient being the number 1) and is expressed by the following equation:

$$r\underline{r}[n]=\underline{\tilde{s}}[n]-w^*\cdot\underline{\tilde{s}}[n]^* \quad (16)$$

It can be easily proved, by simple computation s, that the above linear combination fully equals to applying the following compensation matrix [C]:

$$[C] = \begin{bmatrix} 1 & 0 \\ jw^* & 1+w^* \end{bmatrix} \quad (17)$$

to vector $[\tilde{s}_1[n], \tilde{s}_Q[n]]^T$ consisting of both low frequency components of the received signal.

Figures 4A, 4B:
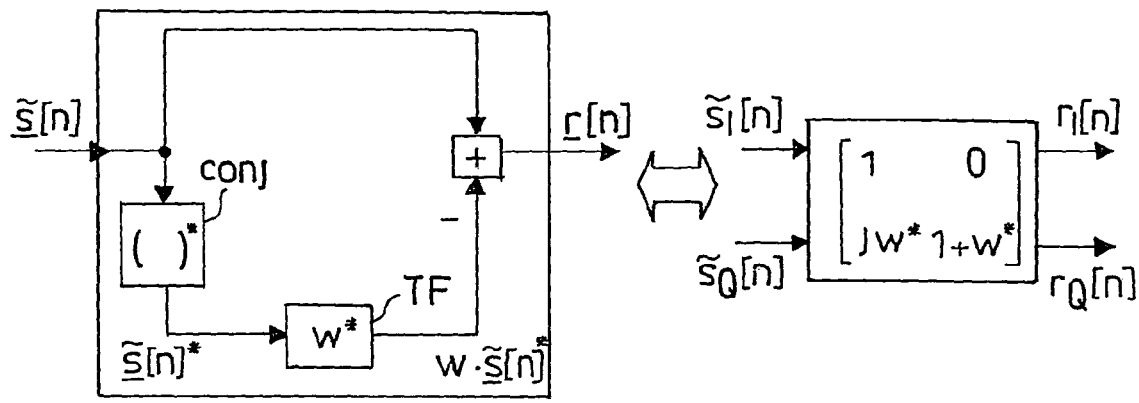
FIGS. 4A and 4B are are block diagrams illustrating the transformations being carried out by a compensation block of the phase and gain imbalance used by the receiver of FIG. 1 and the equivalent matrix representation of this compensation block.

In FIG. 4A there is shown the block diagram corresponding to the imbalance compensation equation, and in FIG. 4B there is shown the equivalent matrix representation of the imbalance compensation block 8, by enhancing the phase output $r_I[n]$ and in quadrature $r_Q[n]$ quantities. With reference to FIG. 4A, the conjugation operation is represented by a block "conj". The multiplication by the conjugated complex compensation coefficient w* is depicted by a filtering block TF. The compensation block 8 is such as to carry out the difference (block "±") between the complex envelope signal s̃[n] and the complex envelope signal s̃[n]* (weighed with coefficient w*).

In theory, to obtain a complete cancellation of the phase and gain imbalance, the coefficient w should take, according to the above example, the following expression:

$$w = \frac{v^*}{\mu} \quad (18)$$

wherein v and μ are the imbalance parameters being defined in the relation (7) which result to be a function of the phase Δφ and gain ε imbalances.

In fact, it should be observed that the signal provided downstream of the ADC converter has (similarly to what has been indicated in the relation (6)) the following complex envelope:

$$\underline{\tilde{s}}[n]=\mu\underline{s}'[n]+v\underline{s}'[n]^* \quad (19)$$

The result on output from the imbalance compensation-block 8 is:

$$\underline{r}[n]=\underline{\tilde{s}}[n]-w^*\underline{\tilde{s}}[n]^2 \quad (20)$$

By replacing (19) in (20) one obtains:

$$\underline{r}[n]=(\mu-w^*v^*)\underline{s}'[n]+(v-w^*\mu^*)\underline{s}[n]^* \quad (23)$$

in this latter expression (23) the term proportional to s'[n] is the useful part of the signal received whereas the term proportional to s'[n]* is the interfering signal being generated because of the imbalance. It is now understood that by selecting the coefficient w such as indicated in the expression (18) one obtains the complete cancellation of the interference contribution to the second term of (23).

Therefore, it has been demonstrated that the structure of the compensation block 8 is capable, in theory, of carrying out a complete cancellation of the phase and/or gain imbalance effect. Therefore, on output from the compensation block 8 the complex envelope signal r[n] would be, in an ideal compensation condition, as follows:

$$\underline{r}[n]=(\mu-w^*v^*)\underline{s}[n]e^{-j\Delta\omega n} \quad (23.i)$$

The signal r[n] the complex envelope of which is expressed by the relation (23.i) is thus supplied to the frequency offset compensation block 12.

In block 12, the signal r[n] is combined with the digital signal produced by the numeric control oscillator NCO taking the estimated value Δ̂ω of the frequency offset Δω into account. By assuming that the estimated value is almost equal to the actual value of the frequency offset, Δ̂ω≅Δω, one can deduce that the frequency offset effect is substantially eliminated. Therefore, the signal y[n] having the following complex envelope would be provided on output from the block 12:

$$\hat{y}[n]=\hat{r}[n]e^{-j\hat{\Delta}\omega t}=(\mu-w^*v^*)\underline{s}[n]e^{-j\Delta\omega t}e^{-j\hat{\Delta}\omega t}\cong(\mu-w^*v^*)\underline{s}[n] \quad (23.ii)$$

Thus, the signal y[n] is given by the useful digital signal s[n] multiplied by a complex gain factor (μ−w*v*) alone. The digital signal y[n], the complex envelope of which is expressed by the relation (23.ii), may be subjected to the serial-to-parallel conversion of block 14 and the transformation in the discrete frequency domain being carried out by block 15 (DFT) thereby resulting in a transformed signal in which the intercarrier interference term as expressed in the relationship (13) is null. The subsequent phases of equalization and decision carried out by the equalizer 16 and the estimator stage 17 can take place in a conventional manner.

It is important to observe that the compensation coefficient w can be actually found by applying the relation (18) and the relations (7), which express the imbalance parameters μ and ν, in the case where the values of the phase $\Delta\phi$ and gain $\epsilon$ imbalances can be known a priori. A priori knowledge of the values of the phase $\Delta\phi$ and gain $\epsilon$ imbalances entails costly phases of measuring the receiver behavior 100.

Furthermore, it should be considered that these phase $\Delta\phi$ and gain $\epsilon$ imbalance values being evaluated may vary over time due to different causes, such as temperature or power supply variations. Therefore, a method for evaluating the compensation coefficient w which is independent from the values of the phase $\Delta\phi$ and gain $\epsilon$ imbalances is particularly desired.

Advantageously, to the compensating block 8, there is provided a computed value of the compensation coefficient w, which is evaluated according to a principle providing an optimum value $w_{opt}$, without a priori knowledge of the values of the phase $\Delta\phi$ and gain $\epsilon$ imbalances.

As will be described in detail below, the evaluation and adaptation block 21 (in cooperation with other blocks of the receiver 100) is such as to implement an algorithm for the computation of this optimum value, $w_{opt}$, to be provided to the compensation block 8.

Training Step

As partially stated above, the operating method of the receiver 100, provides one or more training phases (test) during which the transmitter Tx from FIG. 3 sends OFDM signals (for example, packets according to the above-mentioned standards) the carried symbols of which being preset and known to the receiver 100. The channel estimate block 20 compares the symbols transmitted with the estimated ones on output from the decisor stage 17, and obtains information on the transmission channel CH. Particularly, the channel estimate block 20 carries out an estimate of the transmission channel transfer function, preferably, for all the OFDM signal subcarriers, according to conventional techniques, which will not be described.

This estimate is carried out during a training phase of the received packet and it may be updated during reception to compensate any variation either induced by the radio frequency channel or due to the presence of a residual frequency offset. The training phase also allows to estimate the frequency offset $\hat{\Delta}\omega$ and thus it enables the numeric control oscillator NCO to synthesize the signal to be provided to the multipliers 13 and 24.

Procedure to Find the Optimum Compensation Coefficient $w_{opt}$, Being Carried Out by the Evaluation and Adaptation Block 21.

In the description below, reference will be made to the particular case of packet communications (in accordance, for example, to the IEEE 802.11a or Hiperlan/2 standards). The complex envelop signal r[n] (expressed as a function of time) provided at the second output port 11 of the imbalance compensation block 8 is expressed by the following relationship:

$$\underline{r}[n] = \underline{\tilde{s}}[n] - w \cdot \underline{\tilde{s}}[n]^* \quad (24)$$

The N time samples belonging to the generic $m^{th}$ OFDM symbol being carried by the received signal provided on-output from the block 12 of frequency offset compensation should be considered:

$$\left[\underline{r}_m[n] \cdot e^{+j\hat{\Delta}\omega t_n}\right]_{n=0 \ldots N-1} \quad (25)$$

As already stated above, the frequency offset compensation is carried out by means of the numeric control oscillator NCO generating the complex sinusoid $\exp(j\hat{\Delta}\omega t_n)$, wherein $\hat{\Delta}\omega$ is the estimate of the frequency offset as measured during the training step. Block 15 carries out the DFT of the sample group. The generic $k^{th}$ outlet of block 15 is:

$$Y_m[k] = DFT_k\left\{\left[\underline{r}_m[n] \cdot e^{+j\hat{\Delta}\omega t_{m,n}}\right]_{n=0 \ldots N-1}\right\} \quad (26)$$

By defining:

$$\left| \begin{array}{l} \beta_m[k] = DFT_k\left\{\left[\underline{\tilde{s}}_m[n] \cdot e^{+j\hat{\Delta}\omega t_{m,n}}\right]_{n=0 \ldots N-1}\right\} \\ \alpha_m[k] = DFT_k\left\{\left[\underline{\tilde{s}}_m[n]^* \cdot e^{+j\hat{\Delta}\omega t_{m,n}}\right]_{n=0 \ldots N-1}\right\} \end{array} \right. \quad (27)$$

We can rewrite the (26) as follows:

$$Y_m[k] = \beta_m[k] - w^* \alpha_m[k] \quad (28)$$

The signals of relationship (27) will be designated below as the first primary signal $\beta_m[k]$ and the first reference signal $\alpha_m[k]$ In order to better understand the type of information being carried by the first reference signal $\alpha_m[k]$ and the first primary signal $\beta_m[k]$, and hence the role thereof, the following considerations should be made. The complex envelope signal $\underline{\tilde{s}}_m[n]$ (relative to the generic $m^{th}$ symbol and provided on output 7 of the analogue-to-digital conversion block 6) has the form directly deriving from the equation (6) as indicated below:

$$\underline{\tilde{s}}_m[n] = \mu \cdot \underline{s}'_m[n] + \nu \cdot \underline{s}'_m[n]^* \quad (28.i)$$

By replacing the equation (5) ($\underline{s}'(t) = \underline{s}(t) \cdot e^{-j\Delta\omega t}$) in the relation (28.i) there results:

$$\underline{\tilde{s}}_m[n] = \mu \cdot \underline{s}_m[n] \cdot e^{-j\Delta\omega t_{m,n}} + \nu \cdot \underline{s}_m[n]^* \cdot e^{+j\Delta\omega t_{m,n}} \quad (28.ii)$$

By using the relation (28.i), it is possible to rewrite the arguments of the function $DFT_k$ appearing in the relationships (27) for both signals $\beta_m[k]$ and $\alpha_m[k]$ as follows:

$$\underline{\tilde{s}}_{\alpha\beta PR}\underline{\tilde{s}}_m[n]^* \cdot e^{+j\hat{\Delta}\omega t_{m,n}} \cong \mu^* \cdot \underline{s}_m[n]^* \cdot e^{+2j\Delta\omega t_{m,n}} + \nu^* \cdot \underline{s}_m[n] \quad (28.iii)$$

Wherein the complex envelope signal $\underline{\tilde{s}}_{\alpha\beta PR}$ will be denominated, in the following, as the second primary signal, and $$\underline{\tilde{s}}_{\alpha REF} = \underline{\tilde{s}}_m[n]^* \cdot e^{+j\hat{\Delta}\omega t_{m,n}} \cong \mu^* \cdot \underline{s}_m[n]^* \cdot e^{+2j\Delta\omega t_{m,n}} + \nu^* \cdot \underline{s}_m[n] \quad (28.iv)$$

wherein the complex envelope signal $\underline{\tilde{s}}_{\alpha REF}$ will be denominated, in the following, as the second reference signal.

It should be observed that the type of information carried by signals $\alpha_m[k]$ and $\beta_m[k]$ is completely similar to the one being carried by the complex envelope signals $\underline{\tilde{s}}_{\beta PR}$ and $\underline{\tilde{s}}_{\alpha REF}$ of formulae (28.iii) and (28.iv), in that they are linked by a discrete Fourier transform-operation, $DFT_k$ being evaluated on the k-index subcarrier.

The second primary signal $\underline{\tilde{s}}_{\beta PR}$ (and consequently also the first primary signal $\beta_m[k]$) is what one would obtain in a receiving apparatus without the compensation block 8 (or rather by setting the compensation coefficient w to zero) The first $\beta_m[k]$ and the second $\underline{\tilde{s}}_{\beta PR}$ primary signals are formed by a first proportional component (according to the imbalance parameter μ) to the useful digital signal $\underline{s}_m[n]$, and a second proportional interfering component (according to the imbalance parameter ν) to the signal $\underline{s}_m[n]^*$ (conjugated complex of the useful digital signal $\underline{s}_m[n]$). It should be noted that for realistic values of the phase $\Delta\phi$ and gain $\epsilon$ it results $|\mu| \gg |\nu|$.

Therefore, in the first $\beta_m[k]$ and second $\underline{\tilde{s}}_{\beta PR}$ primary signals the first component proportional to the useful digital signal $\underline{s}_m[n]$ is dominating relative to the second interfering component proportional to signal $\underline{s}_m[n]^*$.

The first $\alpha_m[k]$ and second $\underline{\tilde{s}}_{\alpha REF}$ reference signals are formed by a respective first component, which is proportional (according to the imbalance parameter $v^*$) to the useful digital signal $\underline{s}_m[n]$, and a second interfering component, proportional (according to the imbalance parameter $\mu^*$) to the signal $\underline{s}_m[n]^*$ (conjugated complex of the useful digital signal $\underline{s}_m[n]$).

Therefore, in the first $\alpha_m[k]$ and second $\underline{\tilde{s}}_{\alpha REF}$ reference signals, the interfering component (being proportional to the signal $\underline{s}_m[n]^*$) is dominating relative to the component proportional to the useful digital signal $\underline{s}_m[n]$. Particularly, the first reference signal $\alpha_m[k]$ is basically is the carrier of the disturbance component being generated by the phase and gain imbalance.

It should be observed, for completeness sake, that according to what has been stated, the processing carried out by block 8 (being outlined in FIG. 4A) can be seen as a difference (block "±") between the complex envelope signal $\underline{\tilde{s}}[n]$, acting as the primary input, and the complex envelope signal $\underline{\tilde{s}}[n]^*$, acting as the reference signal, weighed with the coefficient $w^*$.

Referring back to the relation (28), it should be observed that the DTF $k^{th}$ output consist of a linear combination according to the coefficients $(1,-w^*)$ of the terms ($\beta_m[k]$, $\alpha_m[k]$). The evaluation and adaptation block 21 defines the optimum coefficient $w_{opt}$ (and accordingly the compensation matrix [C]) such that the DFT output in the $k^{th}$ generic position will depend only on the symbol X[k] being transmitted on the same subcarrier and not on those being transmitted on the other subcarriers.

Let us consider, particularly, the channel estimate on the $k^{th}$ subcarrier $\hat{H}[k]$ being carried out by the estimate block 20. Given the value H[k] of the frequency response of the channel on the $k^{th}$ subcarrier relative to the case of absence of imbalance (i.e. $\lambda=1, v=0$) one can write relative to the estimated value $\hat{H}[k]$:

$$\hat{H}[k] = \eta H[k] \quad (29)$$

where $\eta$ is a suitable complex number makes the equality true (29).

The estimated value $\hat{H}[k]$ is provided on the $k^{th}$ output of the channel estimate unit 20 together with the channel estimated values relating to other subcarriers. The multiplexer 19 selects the $k^{th}$ output such as to provide the value $\hat{H}[k]$ to the adaptation block 21 of coefficient w. Furthermore, the estimator stage 17 and the multiplexer 19 provide the estimate of the $m^{th}$ received symbol $\hat{X}_m[k]$ on the $k^{th}$ subcarrier. The adaptation block 21 builds the following further reference signal:

$$\hat{Y}_m[k] = \hat{H}[k] \cdot \hat{X}_m[k] \quad (30)$$

representing implicitly the estimate of the DFT $k^{th}$ output should the imbalance be null. It should be observed, indeed, that signal being expressed in (30) depends only on the symbol transmitted on the $k^{th}$ carrier. Accordingly, the error $e_m[k]$ being expressed as the difference between the reference value $\hat{Y}_m[k]$ and the DFT actual output $Y_m[k]$ for the $m^{th}$ OFDM symbol is:

$$\begin{aligned} e_m[k] &= \hat{Y}_m[k] - Y_m[k] \\ &= \hat{Y}_m[k] - (\beta_m[k] - w^*\alpha_m[k]) \\ &= (\hat{Y}_m[k] - \beta_m[k]) + w^*\alpha_m[k] \end{aligned} \quad (31)$$

Let us evaluate now the quadratic error $|e_m[k]|^2$:

$$|e_m[k]|^2 = ((\hat{Y}_m[k]-\beta_m[k])+w^*\alpha_m[k]) \cdot ((\hat{Y}_m[k]-\beta_m[k])+w^*\alpha_m[k])^* \quad (32)$$

$$|e_m[k]|^2 = ((\hat{Y}_m[k]-\beta_m[k])|^2 + w^*\alpha_m[k]\alpha_m[k]^*w + w^*\alpha_m[k](\hat{Y}_m[k]-\beta_m[k])^* + (\hat{Y}_m[k]-\beta_m[k])\alpha_m[k]^*w \quad (33)$$

By using (33) it is possible to compute the expected quadratic error J(w) (or mean quadratic error). It is a function of the vector of coefficient w:

$$J(w) = E\{|e_m[k]|^2\} = E\{|\hat{Y}_m[k]-\beta_m[k]|^2\} + w^*E\{\alpha_m[k]\alpha_m[k]^*\}w + w^*E\{\alpha_m[k](\hat{Y}_m[k]-\beta_m[k])^*\} + E\{(\hat{Y}_m[k]-\beta_m[k])\alpha_m[k]^*\}w \quad (34)$$

As will be understood by those skilled in the art, the operator $E\{\}$ carries out the expected value of the aleatory variable being the argument thereof.

For clarity sake, let us assume:

$$\begin{vmatrix} A = E\{\alpha_m[k] \cdot \alpha_m[k]^*\} \\ B = E\{\alpha_m[k] \cdot (\hat{Y}_m[k]-\beta_m[k])^*\} \\ P[k] = E\{|\hat{Y}_m[k]-\beta_m[k]|^2\} \end{vmatrix} \quad (35)$$

The (34) can be then rewritten as follows:

$$J(w) = P[k] + w^*Aw + w^*B + B^*w \quad (36)$$

In accordance with the invention, the coefficient w to be employed for compensation is the one which minimizes the mean quadratic error J(w). The optimum solution can then be found by setting the gradient of J(w) to zero:

$$\nabla_w J = \frac{\partial J(w)}{\partial w} = 2Aw + 2B \quad (37)$$

It derives that the optimum value $w_{opt}$ is given by:

$$\nabla_w J = 0 \Rightarrow w_{opt} = -\frac{B}{A} \quad (38)$$

The result (38) expresses the solution through a direct computation based on the knowledge of the quantities A and B. The fact that the expression (38) actually describes an optimum value of the compensation coefficient w is discussed below.

According to a first embodiment of the invention, the evaluation and adaptation block 21 computes the quantities A and B as being expressed by the relations (35), as a function of the first reference signal $\alpha_m[k]$, of the first primary signal $\beta_m[k]$ and the further reference signal $\hat{Y}_m[k]$. According to a preferred embodiment of the invention, the search of the optimum value $w_{opt}$ is carried out by the adaptation block 21 by means of an iterative procedure based on the gradient method (known per se to those skilled in the art) allowing to reach the solution for subsequent approximations. This procedure updates the value of coefficient w, for example, for each received OFDM symbol. The updating formula is:

$$w_{m+1} = w_m - \delta \cdot \nabla_w J(w_m) \tag{39}$$

In the formula (39) the adaptation parameter $\delta$ fixes the procedure convergence speed to the solution, further determining the stability of the procedure itself. This parameter will be advantageously selected such as to ensure the stability thereof. Particularly, the convergence is ensured when:

$$0 < \delta < \frac{1}{A} \tag{40}$$

Below there is described a preferred method for evaluating the gradient of the mean quadratic error function J(w) to be employed for application of formula (39).

Evaluation of the Gradient of the Mean Quadratic Error Function J(w)

To apply the formula (39), the value of function gradient J(w) as computed at the coefficient $w_m$ being determined at the previous symbol is required to be known. Given that operations of expected value of aleatory variables are involved to obtain the exact value of the gradient; an approximate value for example can be used in practice. In the following there is described a methodology for evaluating this approximate value to be used by the evaluation and adaptation block 21.

From the following probabilistic expression of $\nabla J(w_m)$ $$\nabla J = 2 \cdot (A \cdot w_m - B) \tag{41}$$

$$= 2 \cdot (E\{\alpha_m[k] \cdot \alpha_m^*[k]\} \cdot w_m - E\{\alpha_m[k] \cdot (\hat{Y}_m[k] - \beta_m[k])^*\})$$

$$= 2 \cdot E\{\alpha_m[k] \cdot \alpha_m^*[k] \cdot w_m - \alpha_m[k] \cdot (\hat{Y}_m[k] - \beta_m[k])^*\}$$

$$= 2 \cdot E\{\alpha_m[k] \cdot (\alpha_m^*[k] \cdot w_m - (\hat{Y}_m[k] - \beta_m[k])^*)\}$$

Based on the relationship (31) defining the error, it is observed that:

$$\nabla J(w_m) = 2 E\{\alpha_m[k] \cdot e_m[k]\} \tag{42}$$

The gradient estimated value is obtained by eliminating the operation of expected value E{ } from the equation (42) using the instant and non mediated value:

$$\nabla_w J \approx 2\alpha_m[k] \cdot e_m[k] \tag{43}$$

Accordingly, by combining (39) and (43) the adaptation formula is obtained which the evaluation and adaptation block 21 can use in practice:

$$w_{m+1} = w_m - \delta \cdot 2 \cdot \alpha_m[k] \cdot e_m^*[k] \tag{44}$$

The relationship (44) corresponds to the Least Mean Square adaptation algorithm (LMS), which is known per se to those skilled in the art. The formula (44) can be implemented by the adaptation block 21 and all the quantities expressed therein arenas defined above.

Particularly, the relationship (44) shows the compensation coefficient w is evaluated taking into account the first reference signal $\alpha_m[k]$ which has a predominant component relative to the disturbance associated to the phase and gain imbalances. Furthermore, the quantity $e_m^*[k]$ can be obtained based on what has been indicated by the second element of the relationship (31), that is:

$$e_m[k] = \hat{Y}_m[k] - Y_m[k]$$

Figure 10:
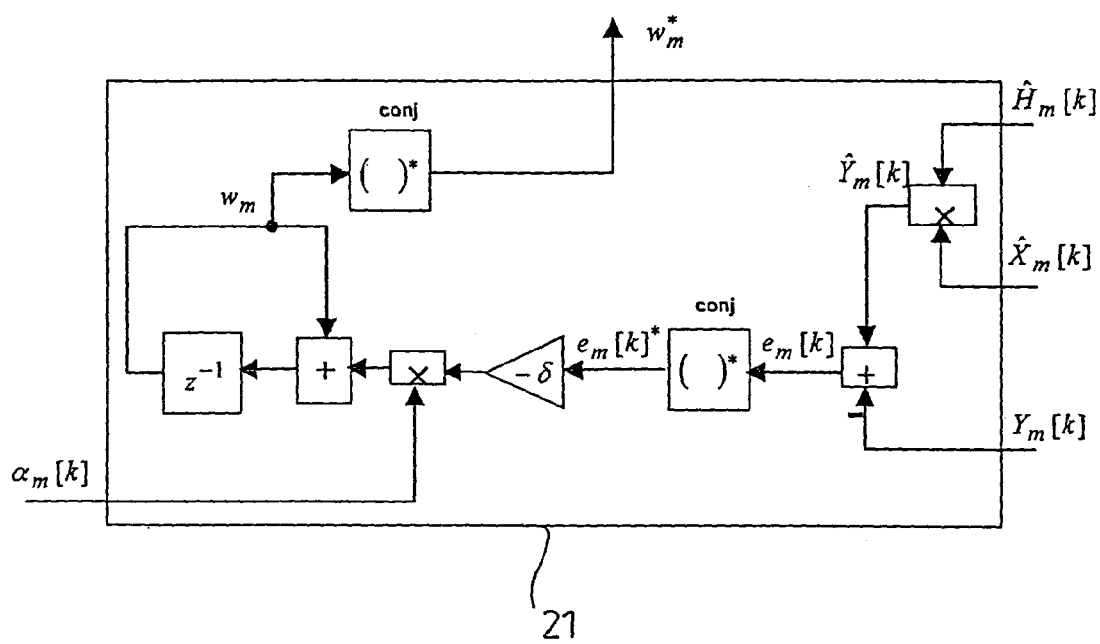
FIG. 10 is a block diagram illustrating operations carried out by an adaptation block in accordance with an embodiment of the invention and to be used in the receiver of FIG. 1.

FIG. 10 illustrates by means of a block diagram the operations carried out by the adaptation block 21, in accordance with relationship (44). The meaning of the functional blocks from FIG. 10 are understood from the description above, and particularly, block $z^{-1}$ indicates the delay operation on the OFDM symbol.

The second connecting branch 10 of FIG. 1, by operating on the signal on output on the analogue-to-digital converter 6 carries out the conjugation operations (block 23), multiplication for the signal being produced by the numeric control oscillator NCO (block 24, compensating the frequency offset) and discrete Fourier transform (block 25) relative to the $k^{th}$ subcarrier, which are required to build the first reference signal $\alpha_m[k]$, such as defined by the expression (27). It should be observed that the first reference signal $\alpha_m[k]$, because of the way it is built, does not exhibit the effects introduced by the compensation block 8.

For the computation relative to the relationship (44), particularly the plurality of signals listed in PART I and shown in FIG. 1 are also supplied to the adaptation block 21, besides the first reference, signal $\alpha_m[k]$. Advantageously, a single k-index subcarrier is selected for the selection of these input signals to the evaluation and adaptation block 21. In the following, there is described a particular principle for the selection of the index k and; therefore, for the selection of the corresponding subcarrier.

As also confirmed by simulations, (the results of which will be illustrated below), the values of the coefficient w being evaluated according to the relationship (44) enable to carry out a satisfying compensation of the phase and frequency imbalance in the presence of frequency offset, in that they allow to reduce or substantially nullify the effects of this imbalance. The selected value of coefficient w is indeed such as to reduce the contribution of the interfering signal expressed in the relationship (9).

Choice and Selection of the $k^{th}$ Subcarrier being Carried out by the Processing Unit 26.

Figure 5:
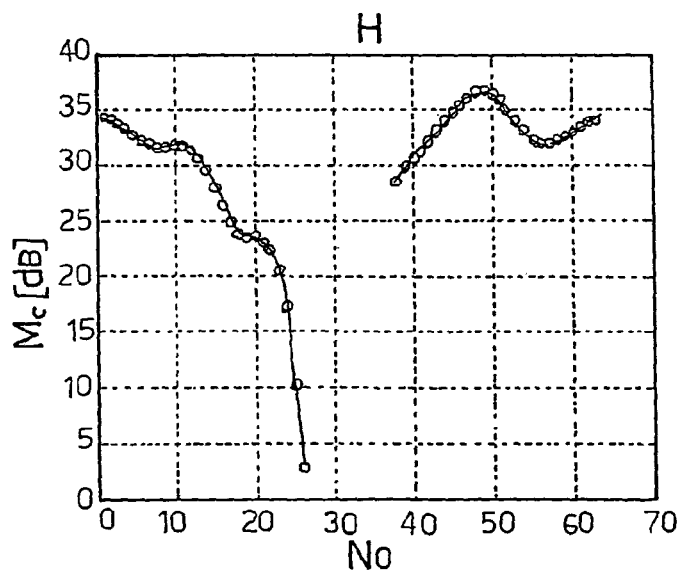
FIG. 5 is a chart illustrating the trend of the frequency response magnitude of a transmission channel upon variation of the subcarrier index of an OFDM signal.

The method in accordance with the invention has been described so far with reference to a generic reference k-index subcarrier. It has been observed that the selection of the reference subcarrier is critic when determining the effectiveness of the adaptation procedure being carried out by the adaptation block 21. This is due to the fact that the radio channel being interposed between the transmitter and the receiver 100 is usually selective in frequency, and therefore the magnitude values of the channel seen by the single subcarriers of the OFDM modulation system can greatly vary, between a subcarrier and another. In FIG. 5 there is shown by way of example the trend of magnitude (being expressed in dB) of the frequency response H of the channel upon variation of the index No of the subcarrier for a radio channel, as obtained by electronic simulations.

Preferably, in the inventive method, the selected reference k-index subcarrier is the one corresponding to the channel frequency response of the greatest magnitude. In formulae, given the indexes set $I_{sub-carrier}$ of the subcarriers being used in the OFDM transmission, the processing unit 26 selects the subcarrier satisfying this relationship:

$$|\hat{H}[k]| \geq |\hat{H}[u]| \, \forall u \in I_{sub-carrier} \tag{45}$$

The signals representative of the estimated transfer functions {Ĥ[u]} are provided to the processing unit 26 by the channel estimate block 20, by means of the inputs. IN-CH-EST being indicated in FIG. 1.

Based on the relationship (45) the processing block 26 provides an indication on the selected $k^{th}$ subcarrier and provides it to the multiplexers 18, 19 e 22 and block 25. It should be noted that the estimate of the channel-response {Ĥ[u]} u∈$I_{sub-carrier}$ is carried out during the training phase of the OFDM symbol packet and may be updated in the course of reception.

Let's consider again the expression of the DFT $k^{th}$ output of the relationship (13) which is reported for clarity purposes:

$$Y[k] = DFT_k\{\underline{y}[n]\} = \mu \cdot Z[k] + v \cdot \sum_{u=-N/2}^{\frac{N}{2}-1} Z[u]^* \cdot \sigma(k, u, \xi), \quad (13)$$

$$k = 0 \ldots N-1$$

A contribution of additive noise N[k] different from the imbalance distortion noise, which is indicated below with D[k], should be considered in the expression of Y[k]. The $k^{th}$ output Y[k] can then be expressed as:

$$\begin{vmatrix} Y[k] = \mu \cdot H[k]X[k] + D[k] + N[k] \\ D[k] = v \cdot \sum_{u=-N/2}^{\frac{N}{2}-1} (H[-k]X[-k]) \cdot \sigma(k, u, \xi) \end{vmatrix} \quad (46)$$

It is understood from (46) that the principle at the heart of the subcarrier selection is motivated by the fact that, in the hypothesis of an approximatively flat noise in the receive band, the thus-selected subcarrier is that providing the best ratio of useful signal μZ[k] and additive noise N[k]. Accordingly, the subcarrier respecting the relationship (45) is the best candidate to "guide" the adaptation because the additive noise N[k] has a lower impact than the other subcarriers.

It should be observed that the method illustrated with reference to the use of only the subcarrier with the maximum magnitude among which being used in the particular transmission system, can be easily extended to a group of n subcarriers with n>2. The group of these subcarriers is formed by selecting the first n subcarriers resulting from the decreasing sequential order, based on magnitude, of the subcarrier set.

In the exemplary case of two subcarriers, the values of $\alpha_m[i]$ and $e_m^*[i]$ for the $i^{th}$ subcarrier and the values $\alpha_m[j]$ and $e_m^*[j]$ for the $j^{th}$ subcarrier, in accordance with the relationships (27) and (31) will be evaluated. The relationship (44) for the adaptation of coefficient w will be as follows:

$$w_{m+1} = w_m - \delta \cdot 2 \cdot \alpha_m[i,j] \cdot e_m[i,j] \quad (44')$$

wherein the value of the product $t[i,j] = \alpha_m[i,j]e_m^*[i,j]$ is an mean (for example, an arithmetic mean) of the value $t[i] = \alpha_m[i]e_m[i]$ and the value $t[j] = \alpha_m[j]e_m[j]$:

$$t[i,j] = (t[i] + t[j])/2$$

Strategy of Actuation of the Adaptation as Applied by the Processing Unit 26.

Advantageously, the method in accordance with the invention can provide, after the reference subcarrier has been selected, a processing phase to establish whether providing for the adaptation of the coefficient w of adaptation block 8 or not. According to an example of the inventive method, the adopted principle is based on the comparison between the estimate of the overall signal-to-noise ratio as measured on the selected subcarrier and a suitable threshold value.

Preferably, the comparison value $SDR_{imb}$ is linked to the ratio of the useful signal power μ·H[k]X[k] and the distortion power D[k] being introduced by the imbalance, in the case of flat channel (this being the worst case in terms of distortion due to imbalance), computed for the maximum values of gain $\epsilon_{max}$ and phase $\Delta\phi_{max}$ imbalances as determined in the design phase. This value results from the following relationship:

$$SDR_{imb} \cong \frac{|\mu(\epsilon_{max}, \Delta\phi_{max})|^2}{|v(\epsilon_{max}, \Delta\phi_{max})|^2} \quad (47)$$

For example, in $$\Delta\phi_{max} = 2°, \frac{1+\epsilon_{max}}{1-\epsilon_{max}} = 1 \text{ dB},$$

it has been obtained by using the (7): $SDR_{imb} \cong 23$ dB.

Let us define the overall signal-to-noise ratio quantity SNDR[k] as the ratio of the useful signal μ·H[k]X[k] and additive noise N[k] powers, being added to the distortion due to the imbalance D[k], as measured on the selected $k^{th}$ subcarrier.

In the case where the overall signal-to-noise ratio is significantly lower, (for example, lower than a positive constant M that can be expressed in dB) than the compared signal-to-noise ratio $SDR_{imb}$, i.e. the following relation applies:

$$SNDR[k] < SDR_{imb} - M \quad (48)$$

then it can be deduced that the reception of the $k^{th}$ subcarrier is limited by the additive noise N[k] and not by the distortion D[k] introduced by the imbalance. In this circumstance carrying out the adaptation is not expedient, because the error term being introduced by the D[k] is surpassed by the other noises.

For example, the positive constant M is set based on experimental or simulative tests. It is used to create the conditions in which the adaptation procedure is however activated at the early life of receiver 100 where values of SNDR[k] similar to $SDR_{imb}$ can be measured.

On the other hand, in the case where the value of the overall signal-to-noise ratio SNDR[k] as measured is sufficiently similar to the value of $SDR_{imb}$ or greater, i.e. the:

$$SNDR[k] > SDR_{imb} - M \quad (49)$$

applies, then one cannot suppose that the limiting contribution is the additive noise N[k], thereby the adaptation will be carried out.

As refers to the measurement of the overall signal-to-noise ratio SNDR[k] according to an example of implementation of the invention, the first L OFDM symbols of the receive packet are used, consisting of Q>L OFDM symbols. The estimate is obtained from the following computation:

$$SNDR[k] = \frac{|\hat{H}[k]|^2 E\{|X[k]|^2\}}{\frac{1}{L}\sum_{m=0}^{L-1}(\hat{H}[k]\hat{X}_m[k] - Y_m[k])^2} \quad (50)$$

$$= \frac{|\hat{H}[k]|^2 P_X}{\frac{1}{L}\sum_{m=0}^{L-1}(\hat{Y}_m[k] - Y_m[k])^2}$$

It should be observed that $P_x$ is an a priori-known quantity to the receiver 100 (mean square value of the constellation symbols being transmitted). It should be understood that the other quantities mentioned in the formula (50) are intermediate results of the receiving process.

The comparison expressed by the relationship (49) by employing the parameter SNDR[k] of the relation (50) is carried out by the processing unit 26. At the purpose, the processing unit 26 receives the following signals (with i ranging from 0 and N−1):

- {$\hat{X}_m[i]$} supplied by the estimator 17 by means of the inputs IN-SLIC;
- {$Y_m[k]$} supplied by the DFT evaluation block 15 by means of the inputs IN-DFT;
- {$\hat{H}[k]$} supplied by the channel estimate block 20 by means of the inputs IN-CH-EST.

Particularly, the index k is the one being selected during the subcarrier selection step.

Alternatively, instead of computing the signal-to-noise ratio with a particular subcarrier, one can use an overall SNDR value as measured during the training phase, and which takes into account the average noise on all the subcarriers.

Summary Example of an Operating Method of Receiver 100.

Figure 6:
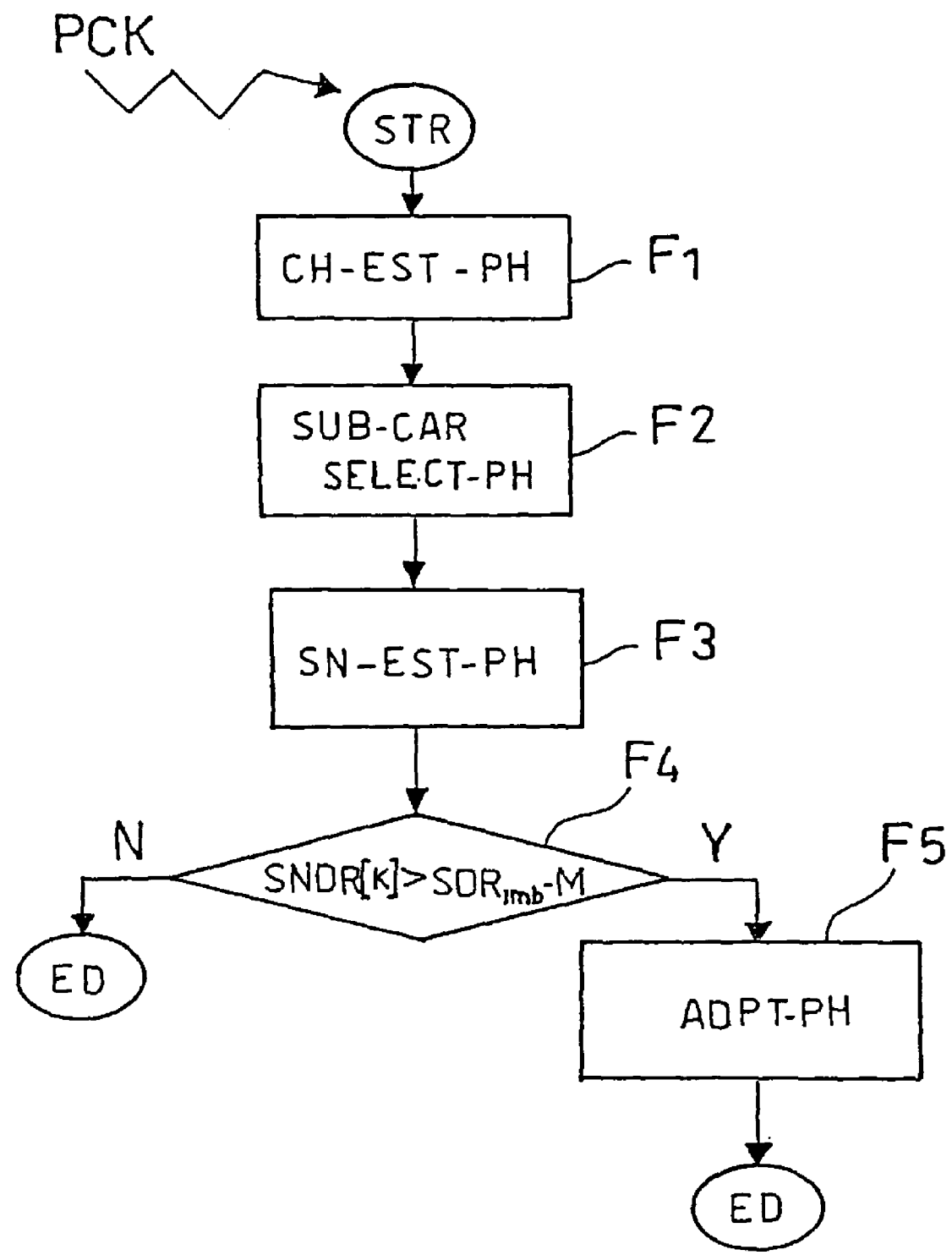
FIG. 6 is a flowchart illustrating several phases of an operation method of the receiver of FIG. 1.

FIG. 6 illustrates by a flow diagram the phases of an exemplary operating method of receiver 100. After a starting phase (STR), an channel estimate phase F1 (CH-EST-PH) is carried out by block 20, at first during a training phase. Subsequently, the k-index subcarrier selection phase F2 (SUB-CAR-SE-LECT-PH) is carried out by applying the relationship (45). The adaptation strategy as described above is then applied by carrying out a signal-to-noise estimate phase F3 SNDR[k] during the first L OFDM symbols (SN-EST-PH) in accordance with, advantageously, the relationship (50) or, alternatively, by evaluating the above overall SNDR value-during the training phase.

Subsequently, the relationship (49) is applied in a comparison phase F4, which enables to decide whether the adaptation of the compensation coefficient is to be applied (branch Y) or not (branch N). In the case where the relationship (45) is satisfied (branch Y), a phase F5 is carried out in which the evaluation and adaptation block 21 evaluates the value of the compensation coefficient w for the subsequent Q-L OFDM symbols (ADPT-PH). This evaluation is carried out, preferably, according to the relationship (44) introduced below. The branches N and Y end up in a respective final phase ED. The operation of blocks 14, 15, 16 and 17 has been described above.

Advantages

The receiver 100 and the operating method thereof are particularly useful in that they ensure an effective reception of the OFDM signals in the presence of a phase and gain imbalance and frequency offset. Particularly, using an imbalance compensation being t carried out in the time domain and using, for the evaluation of the compensation coefficient w, the first reference signal $\alpha_m[k]$, leads to a satisfying reduction of the imbalance and offset effects.

Below, there are reported the results of simulations proving how the inventive method enables to obtain a good performance. The Applicant has observed that the prior art method as described in the above-mentioned article by A. Schuschert et al., when applied in the presence of a frequency offset will lead to an unsuitable performance of the corresponding receiver in practical applications.

Furthermore, it has been noted that the receiver proposed by A. Schuschert et. al. (particularly, its synthesis model of the imbalance compensation filter FIR) would lead to unsuitable performance also in the presence of a frequency offset compensation block comprising a numeric control oscillator. According to this article by A. Schuschert, the signal not yet compensated being provided on output of the DFT transformation stage substantially has the following expression (corresponding, except a different symbology is given, to the relationship (13'), discussed above:

$$Y[k] = \mu \cdot H[k]X[k] + v \cdot H[-k]^* X[-k]^* \quad (13')$$

wherein the second term represents the distortion part to be eliminated. As disclosed-above, the expression (13') is only valid in the case where the frequency offset is null, whereas on the other hand, in the case this offset is not null but is compensated by a particular block, on output from the DFT the signal will take the form expressed by the relation (13) and not (13'). Therefore, the design of the imbalance compensation filter FIR based on the relationship (13') cannot be applied to such a real situation of relationship (13) and not (13').

As already mentioned, other advantages of the inventive method are linked to the particular method for computing the compensation coefficient, the principle of selection of the subcarriers and the adaptation strategy.

Verification of the Optimum Value Convergence of the Compensation Coefficient w of the Procedure being Implemented by the Evaluation and Adaptation Block 21.

The correctness of the relationship (38) expressing the optimum compensation coefficient $w_{opt}$ will be verified below. For such a verification, the results obtained are summarized, by rewriting the relationship (9), i.e. the relationship expressing the signal which would be emitted from the $k^{th}$ output of block 15 (DFT) in the absence of the imbalance compensation carried out by the block 8:

$$Y_m[k] = \mu \cdot Z_m[k] + v \cdot \sum_{u=-N/2}^{\frac{N}{2}-1} Z[u]^* \cdot g(k, u, \xi) \quad (52)$$

$$= \mu \cdot Z_m[k] + v \cdot D_m[k]$$

By applying the coefficient w of the compensation procedure carried out by block 8, the same output of block 15 (DFT) is:

$$Y_m[k] = (\mu - w^* v^*)Z_m[k] + (v - w^* \mu^*)D_m[k] \quad (53)$$

$$= \sigma Z_m[k] + \chi D_m[k]$$

wherein:

$$\begin{cases} \sigma = \mu - w^* v^* \\ \chi = v - w^* \mu^* \end{cases} \quad (54)$$

According to the relationship (5) there results that the error has the following expression:

$$e_m[k] = \hat{Y}_m[k] - Y_m[k] = \eta Z_m[k] - (\sigma Z_m[k] + \chi D_m[k]) \quad (55)$$

By assuming:

$$\begin{cases} P_k = E\{|Z_m[k]|^2\} \\ P_D = E\{|D_m[k]|^2\} \\ \gamma = |v|^2 P_k + |\mu|^2 P_D \\ \xi = v^*((\eta^* - \mu^*)P_k - \mu^* P_D) \end{cases} \quad (56)$$

there result the following expressions for the mean square error and the corresponding gradient:

$$J(w) = E\{|e_m[k]|^2\} \quad (57)$$

$$= \eta^* P_k \eta - \eta^* \sigma P_k - \sigma^* \eta P_k + \chi^* P_D \chi + \sigma^* P_k \sigma$$

$$\nabla J = \frac{\partial J(w)}{\partial w} = 2w\gamma + 2\xi \quad (58)$$

The parameters in the previous equations are implicitly referred to a generic packet and may vary from a packet to another. In the following, by indicating the packet index as the apex of the generic parameter, we will indicate the value that the given quantity adopts during the packet in question. For example, $\sigma^{(u)}$ is the value adopted by the parameter σ during the $u^{th}$ packet.

With $N_u$ are indicated the number of OFDM symbols which during the reception of the generic $u^{th}$ packet are used to update the solution through the formula (39). At the end of the $N_u$ OFDM received symbols we can easily prove that the result of the updating is:

$$w_{res}^{(u)} = w_{res}^{(u-1)}(1 - 2\delta\gamma^{(u)})^{N_u} - 2\delta\xi^{(u)} \sum_{i=0}^{N_u-1} (1 - 2\delta\gamma^{(u)})^i \quad (59)$$

wherein $w_{res}^{(u)}$ indicates the resulting solution upon complexion of the adaptation during the $u^{th}$ packet and, as will be observed, depends on the solution $w_{res}^{(u-1)}$ being obtained upon complexion of the adaptation during the previous packet.

Let us assume now, for clarity purposes, that the receiver 100 is provided with a channel estimate procedure (ideal) allowing to obtain the following estimate result during the reception of the training sequenze of the $u^{th}$ packet $$\hat{H}[k]^{(u)} = \eta^{(u)} H[k] = \sigma^{(u)} H[k] \quad (60)$$

In practice, a procedure being capable to obtain $$\eta^{(u)} = \sigma_{(u)} = \mu - w_{res}^{(u-1)} * v^*.$$

It should be observed that this result would be obtained by affording an infinite number of training OFDM symbols for the channel estimate to be mediated thereon, whereas only two training symbols are available in practice (see-standard IEEE 802.11a or ETSI HIPERLAN/2). It should be emphasized that the adoption of this estimate procedure does not limit the convergence verification at all, because the convergence may be verified by considering a non-perfect channel estimate based only on two available training symbols. In this case, the verification would be more complex.

By using the result assumed in (60), we can write:

$$\mu^{(u)} = v^*((\eta^{(u)*} - \mu^*)P_k^{(u)}) = -|v|^2 w_{res}^{(u-1)} P_k^{(u)} - v^* \mu^* P_D^{(u)} \quad (61)$$

By replacing the (61) in the (59), after several mathematical passages, we obtain:

$$w_{res}^{(u)} = w_{res}^{(u-1)} \left( \frac{|\mu|^2 P_D^{(u)}(1 - 2\delta\gamma^{(u)})^{N_u} + |v|^2 P_k^{(u)}}{\gamma^{(u)}} \right) + \quad (62)$$

$$\frac{v^*}{\mu} \left( 1 - \frac{|\mu|^2 P_D^{(u)}(1 - 2\delta\gamma^{(u)})^{N_u} + |v|^2 P_k^{(u)}}{\gamma^{(u)}} \right)$$

Then, by assuming:

$$\rho(u) = \frac{|\mu|^2 P_D^{(u)}(1 - 2\delta\gamma^{(u)})^{N_u} + |v|^2 P_k^{(u)}}{\gamma^{(u)}} \quad (63)$$

we can rewrite the (62) as follows:

$$w_{res}^{(u)} = w_{res}^{(u-1)} \times \rho(u) + \frac{v^*}{\mu} \times (1 - \rho(u)) \quad (65)$$

Furthermore, let $w_{init}$ be the value employed in the adaptation procedure carried out by block 8, at the beginning of the first packet (packet No. 0), by iterating the (64) there results:

$$w_{res}^{(u)} = w_{init} \times \prod_{n=0}^{u} \rho(n) + \frac{v^*}{\mu} \times \left(1 - \prod_{n=0}^{u} \rho(n)\right) \quad (66)$$

Furthermore, as may be observed based on (63) and the fact that $|1-2\delta\gamma^{(u)}|<1$ is required for the method convergence, there results $|\rho(n)|<1, \forall n$. As a consequence:

$$\lim_{u \to \infty} \prod_{n=0}^{u} \rho(n) = \frac{v^*}{\mu} \Rightarrow \lim_{u \to \infty} w_{res}^{(u)} = \frac{v^*}{\mu} \quad (66)$$

The convergence of sequence $w_{res}^{(u)}$ to the optimum value expressed by the relation (38) for any initial value $w_{init}$ is thus demonstrated.

Briefly, due to the adaptation being carried out packet by packet, two value sequences will be produced. The first one $\{\eta^{(0)}, \eta^{(1)}, \eta^{(2)} \ldots\}$ relates to the scale factors of the channel frequency response being implicitly obtained during the channel estimate phase. The second one $\{w_{res}^{(0)}, w_{res}^{(1)}, w_{res}^{(2)}, \ldots\}$ is the sequence of the values obtained for the coefficient w at the end of the adaptation procedure on the single packet.

In the absence of noise, both sequences will each converge to a respective value ($\Psi_{pt}$, $w_{opt}$) such as to reduce the imbalance error to zero.

Simulations

Figure 7:
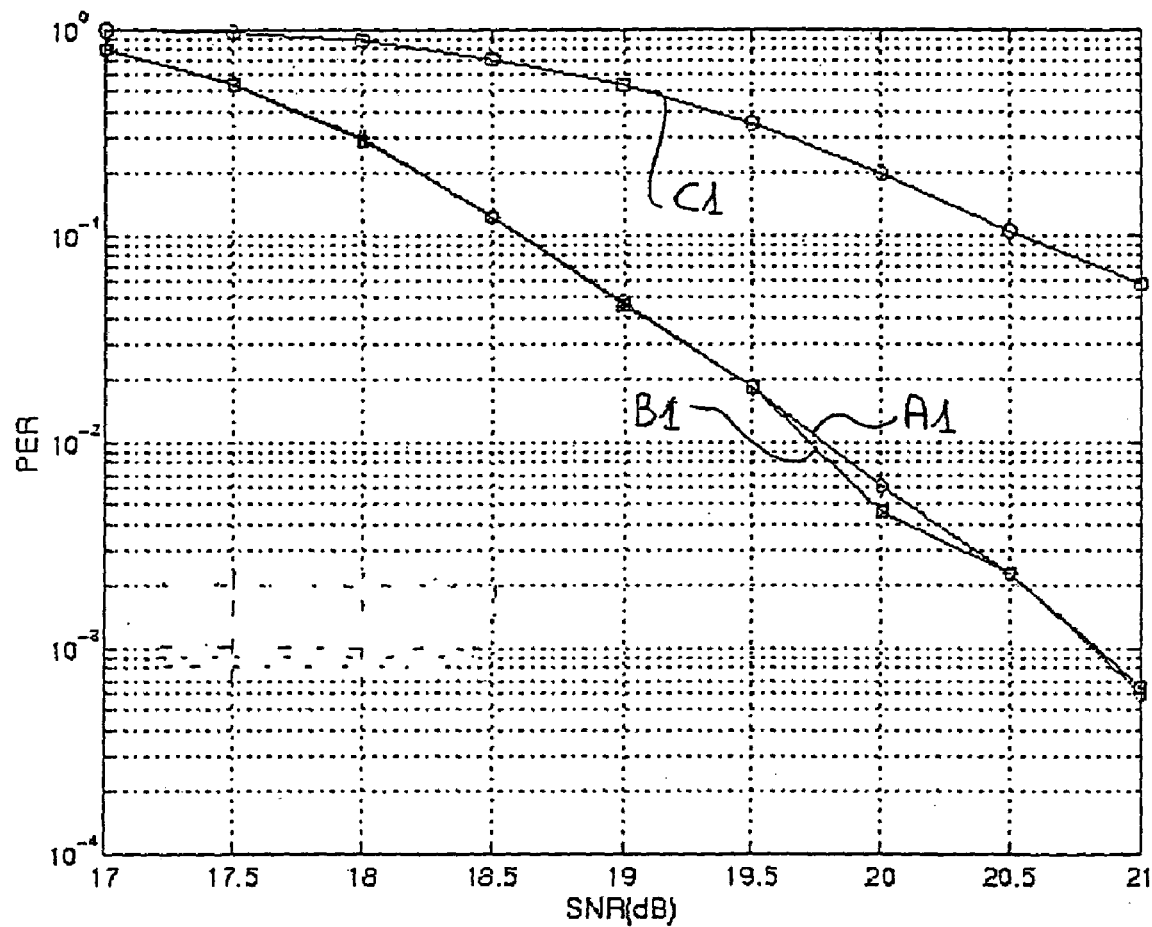
FIGS. 7-9 are graphs illustrating simulations of the invention.

The results of several computer simulations are set forth herein below. FIG. 7 reports three different curves A1, B1, C1 relating to the "packet error rate" PER as a function of the signal-to-noise ratio SNR, being obtained for three different types of receiver, but being however affected by the same imbalance error:

$$\Delta\phi_{max} = 2°, \frac{1+\varepsilon_{max}}{1-\varepsilon_{max}} = 1 \text{ dB}$$

which overall induces a distortion error of $SDR_{imb} \approx 23$ dB.

The first curve A1 relates to the performance of a receiver in which the imbalance error has been perfectly compensated, i.e., an ideal case. In practice, the receiver knows the imbalance parameters, computes the optimum coefficient w (according to the relationship (18)) and installs it. The second curve B1 relates to the performance obtained by applying the method according to the invention, in accordance with the relation (38). The third curve C1 relates to a receiver compensating the imbalance thereof.

It should be understood that the inventive compensation method (second curve B1) ensures substantially the same performance as an ideal compensation method (prima curve A1). Furthermore, the distance from the third curve C1 relative to the absence of compensation relative to those A1 and B1, relative to the presence of compensation, enhances the amount of worsening being introduced by a non compensated imbalance.

The modulation used for these simulations is of the OFDM type combined with a 64QAM constellation. Furthermore, the bits are protected by a FEC (Forward Error Correction Code) of the convolutional rate=¾ type. This type of transmissive mode is one of those adopted in the WLAN IEEE 802.11 standard. The length of the single packets is 1000 bytes. The model of channel used in the simulations is an ideal channel corresponding to a simple gain (without multiple reflections—"multipath").

Figure 8:
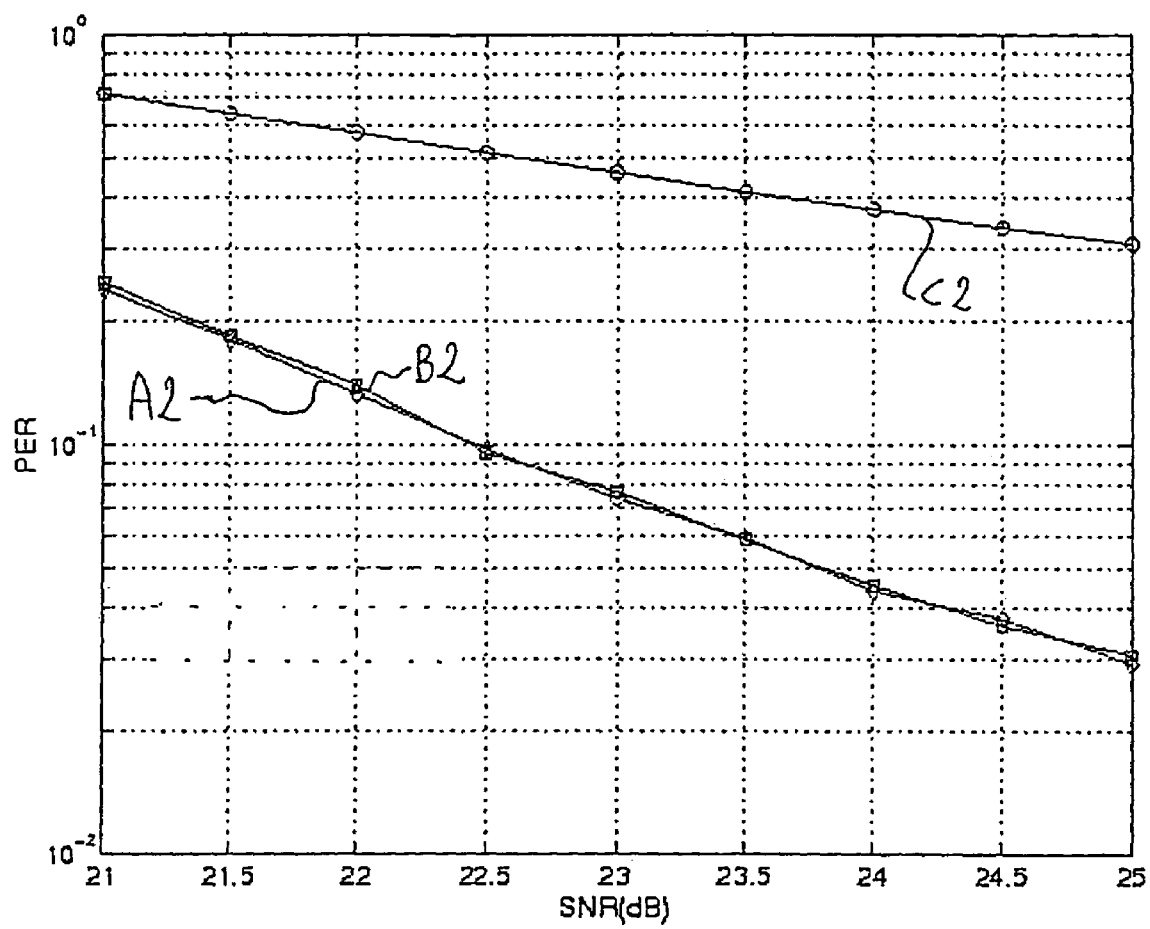

FIG. 8 illustrates three curves A2, B2, C2 analog to the curves A1, B1, C1 from FIG. 7, respectively, but the results are obtained in the presence of a multipath channel with an rms (Root Mean Square) delay spread of 50 ns. For FIG. 8, the same considerations made with FIG. 7 are also valid.

Figure 9:
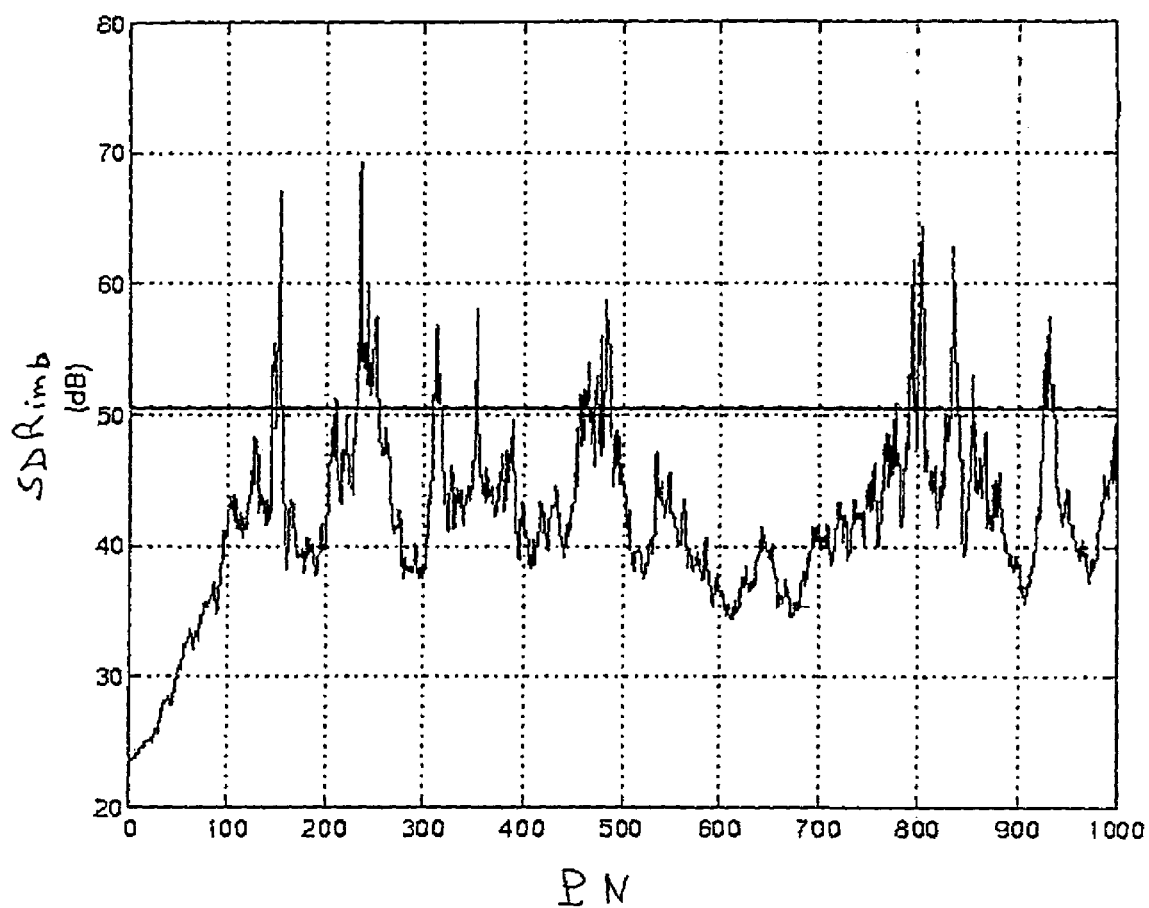

FIG. 9 describes the dynamic behavior of the inventive method, i.e. the evolution of the parameter w during the reception of a packet sequence. More in detail, FIG. 9 is a diagram of the ratio of Useful and Interfering signals $SDR_{imb}$:

$$SDR_{imb} \cong \frac{|\mu - w^* v^*|^2}{|v - w^* \mu^*|^2}$$

Relative to the packet number PN. With reference to the meaning of the expression of the ratio $SDR_{imb}$, it should be understood by considering that (as already described with respect to the equation (23)) in the presence of the compensation carried out by the block 8, the part of received useful signal is proportional to the complex coefficient $\mu - w^* v^*$ whereas the interfering part is proportional to the coefficient $v - w^* \mu^*$.

For the simulation in FIG. 9, only one value of signal-to-noise ratio SNR of 17 dB has been considered, and for the packet sequences of which the reception and transmission have been simulated, it has been evaluated the ratio $SDR_{imb}$ being expressed by the above relationship, as generated by the presence of the imbalance being partially compensated by the inventive method based on the coefficient w.

On the other hand, the flat curve from FIG. 9 represents the mean value of the ratio $SDR_{imb}$ (after the transitory phase has been completed). It should be observed that the coefficient, in any moment of its evolution (except the initial transitory), always ensures a corresponding value $SDR_{imb}$ which is far greater than the SNR of 17 dB, in other words, the interference due to imbalance has been reduced well below the electronic noise level of the receiver, thus rendering it negligible relative to the reception performance. This means that even in such critical reception conditions (low SNR) the method is sufficiently solid for the value of parameter w to be estimated with good results.

It should be observed that the diagram in FIG. 9 relates to the same simulation conditions as the diagram in FIG. 7. Furthermore, similar results to those in FIG. 9 have been obtained also with a simulation carried out in the same conditions as FIG. 7 but with a signal-to-noise ratio SNR of 21 dB. Finally, similar results to FIG. 9 have been obtained in the same simulation conditions as FIG. 8, and considering a signal-to-noise ratio SNR of 21 and 25 dB.

That which is claimed is:

1. A method for processing an Orthogonal Frequency Division Multiplexing (OFDM) signal, the method comprising:
   receiving the OFDM signal and generating a translated signal by translating the OFDM signal in frequency wherein at least one of a phase and gain imbalance is introduced between phase and quadrature components thereof, and a frequency offset relative to a main carrier of the OFDM signal is also introduced;
   converting the translated signal into a digital signal;
   processing the digital signal according to a compensation coefficient to generate a processed signal comprising a useful signal and an interfering signal depending on the imbalance and offset, the processing comprising reducing a contribution of the interfering signal to the processed signal;
   reducing an effect of the frequency offset by combining the processed signal with a compensation signal generated by a numeric control oscillator (NCO); and
   further processing at least a portion of the digital signal to obtain a reference signal indicative of an effect of the imbalance, and including combining the reference signal with the compensation signal.

2. The method according to claim 1, wherein said OFDM signal is associated with the main carrier and includes a plurality of subcarriers each one carrying at least a digital symbol, the method further comprising an OFDM demodulation phase of the processed signal to return a plurality of demodulated signals being obtained by carrying out a discrete Fourier transform and each one being associated to a subcarrier, the demodulated signals in the plurality include a selected signal being associated to a selected k-index subcarrier and a respective digital symbol.

3. The method according to claim 2, wherein said discrete Fourier transform is carried out with a fast Fourier transform.

4. The method according to claim 1, further comprising an adaptation phase to modify the compensation coefficient for reduction of the interfering signal upon variations of the received OFDM signal.

5. The method according to claim 2, wherein said OFDM signal propagates along a transmission channel and the method further comprises:
   estimating a transfer function of the transmission channel for at least said selected k-index subcarrier, said selected signal associated to the selected k-index subcarrier depending on the transmission channel;
   processing the selected signal to reduce the effect of the transmission channel and to provide an estimated signal corresponding to an estimated symbol associated to said selected k-index subcarrier; and
   evaluating an error signal related to a difference between the selected signal and a further reference signal based upon the estimated signal and the transfer function.

6. The method according to claim 5, further comprising an adaptation phase to modify the compensation coefficient for reduction of the interfering signal based upon variations of the received OFDM signal;
   said compensation coefficient depends on said error signal being evaluated such as to be related to a primary signal indicative of said useful signal and said reference signal; and
   the adaptation phase evaluating a value of said compensation coefficient such as to reduce the error signal.

7. The method according to claim 6, wherein said reference signal is obtained with a discrete Fourier transform, relative to the selected k-index subcarrier, of a combination signal obtained from said digital signal and said compensation signal.

8. The method according to claim 7, wherein said error signal is a mean square error obtained from a difference between the selected signal and a second reference signal based upon the estimated signal and the estimated transfer function.

9. The method according to claim 8, wherein said compensation coefficient is adapted to each received symbol associated to said received OFDM signal.

10. The method according to claim 9, wherein said adaptation phase comprises computing a current value of the compensation coefficient associated to a current symbol based on a previous value of the compensation coefficient associated to a previous symbol, the computing being iterative and gradient.

11. The method according to claim 10, wherein said current value is related to said reference signal and said error signal evaluated for the previous symbol.

12. The method according to claim 2, wherein the OFDM demodulation phase includes:
   a serial-to-parallel transformation phase of a combination signal, from the processed signal and the compensation signal, to return digital samples provided on a plurality of outputs corresponding to each subcarrier; and
   a discrete Fourier transform DFT operation of said digital samples providing the plurality of demodulated signals each being associated to a respective subcarrier.

13. The method according to claim 10, wherein said current value is evaluated according to a Least Mean Square adaptation process.

14. The method according to claim 5, further comprising:
   estimating the transfer function of the transmission channel for several subcarriers in the plurality; and
   selecting said selected subcarrier based on the transfer functions.

15. The method according to claim 14, wherein said selecting is based upon a signal-to-noise ratio of the subcarriers.

16. The method according to claim 15, wherein said selecting is based upon magnitudes of respective transfer functions associated with the subcarriers.

17. The method according to claim 14, wherein the OFDM demodulation phase includes:
   a serial-to-parallel transformation phase of a combination signal, from the processed signal and the compensation signal, to return digital samples provided on a plurality of outputs corresponding to each subcarrier; and
   a discrete Fourier transform DFT operation of said digital samples providing the plurality of demodulated signals each being associated to a respective subcarrier;
   wherein the method further comprises:
   equalization of the demodulated signals based upon the estimated transfer functions; and
   obtaining a plurality of the estimated signals, from the equalized signals, including said estimated signal.

18. The method according to claim 2, further comprising:
   an adaptation phase to modify the compensation coefficient for reduction of the interfering signal upon variations of the received OFDM signal;
   evaluating an overall signal-to-noise ratio in view of said useful signal, interfering signal, and an additional signal; and
   comparing the overall signal-to-noise ratio with a threshold value and modifying the compensation coefficient based thereon.

19. The method according to claim 18, wherein the overall signal-to-noise ratio is evaluated based on said selected k-index subcarrier.

20. The method according to claim 18, wherein said threshold value is a function of a ratio of a further useful signal and a further interfering signal evaluated in a case of constant transfer function of the transmission channel and in conditions where effects of the imbalance are the increased.

21. The method according to claim 18, wherein evaluating the overall signal-to-noise ratio and comparing it with the threshold value are carried out while receiving a first sub-set of the plurality of digital symbols carried by the received OFDM signal.

22. The method according to claim 21, wherein adapting the compensation coefficient is carried out for a remaining sub-set of the plurality of digital symbols associated with the received OFDM signal.

23. The method according to claim 1, wherein said received OFDM signal carries symbols being modulated according to a M-QAM modulation.

24. The method according to claim 1, wherein said received OFDM signal is received over a wireless channel.

25. The method according to claim 1, wherein said received OFDM signal was transmitted with one of a packet transmission technique and a non-packet transmission technique.

26. A receiver for an OFDM signal associated with a main carrier and including a plurality of subcarriers each carrying at least one digital symbol, the receiver comprising a processor for
   receiving the OFDM signal and generating a translated signal by translating the OFDM signal in frequency wherein at least one of a phase and gain imbalance is introduced between phase and quadrature components thereof, and a frequency offset relative to a main carrier of the OFDM signal is also introduced;
   converting the translated signal into a digital signal;
   processing the digital signal according to a compensation coefficient to generate a processed signal comprising a useful signal and an interfering signal depending on the imbalance and offset, the processing comprising reducing a contribution of the interfering signal to the processed signal;

reducing an effect of the frequency offset by combining the processed signal with a compensation signal generated by a numeric control oscillator (NCO); and further processing at least a portion of the digital signal to obtain a reference signal indicative of an effect of the imbalance, and including combining the reference signal with the compensation signal.

27. The receiver according to claim 26, wherein said OFDM signal is associated with the main carrier and includes a plurality of subcarriers each one carrying at least a digital symbol, the processor further performs an OFDM demodulation phase of the processed signal to return a plurality of demodulated signals being obtained by carrying out a discrete Fourier transform and each one being associated to a subcarrier, the demodulated signals in the plurality include a selected signal being associated to a selected k-index subcarrier and a respective digital symbol.

28. A transmission system comprising:

a transmitter to transmit an OFDM signal along a transmission channel, the OFDM signal being associated with a main carrier and including a plurality of subcarriers each carrying at least one digital symbol; and a receiver to receive the OFDM signal propagated along said transmission channel, the receiver comprising a processor for receiving the OFDM signal and generating a translated signal by translating the OFDM signal in frequency wherein at least one of a phase and gain imbalance is introduced between phase and quadrature components thereof, and a frequency offset relative to a main carrier of the OFDM signal is also introduced, converting the translated signal into a digital signal, processing the digital signal according to a compensation coefficient to generate a processed signal comprising a useful signal and an interfering signal depending on the imbalance and offset, the processing comprising reducing a contribution of the interfering signal to the processed signal, reducing an effect of the frequency offset by combining the processed signal with a compensation signal generated by a numeric control oscillator (NCO), and further processing at least a portion of the digital signal to obtain a reference signal indicative of an effect of the imbalance, and including combining the reference signal with the compensation signal.

29. The system according to claim 28, wherein said OFDM signal is associated with the main carrier and includes a plurality of subcarriers each one carrying at least a digital symbol, the processor further performs an OFDM demodulation phase of the processed signal to return a plurality of demodulated signals being obtained by carrying out a discrete Fourier transform and each one being associated to a subcarrier, the demodulated signals in the plurality include a selected signal being associated to a selected k-index subcarrier and a respective digital symbol.

* * * * *

UNITED STATES PATENT AND TRADEMARK OFFICE
CERTIFICATE OF CORRECTION

| | |
|---|---|
| PATENT NO. | : 7,864,878 B2 |
| APPLICATION NO. | : 11/197241 |
| DATED | : January 4, 2011 |
| INVENTOR(S) | : Capozio |

It is certified that error appears in the above-identified patent and that said Letters Patent is hereby corrected as shown below:

Column 1, Line 39      Delete: "allowing to"
Insert: --allowing it to--

Column 1, Line 53      Delete: "generates-two"
Insert: --generates two--

Column 1, Line 65      Delete: "3.18"
Insert: --318--

Column 2, Line 28      Delete: "prior,"
Insert: --prior art,--

Column 2, Line 31      Delete: "is"
Insert: --are--

Column 2, Line 40      Delete: "itself"
Insert: --itself.--

Column 2, Line 46      Delete: "better-understand"
Insert: --better understand--

Column 2, Line 58      Delete: "are are"
Insert: --are--

Column 3, Line 49      Delete: "(Finite Response Filter)"
Insert: --(Finite Impulse Response)--

Column 4, Line 44      Delete: "it"
Insert: --It--

Signed and Sealed this
Thirtieth Day of August, 2011

David J. Kappos
*Director of the United States Patent and Trademark Office*

CERTIFICATE OF CORRECTION (continued)
U.S. Pat. No. 7,864,878 B2

| | |
|---|---|
| Column 6, Line 11 | Delete: "p(t)"<br>Insert: --$\underline{p}(t)$-- |
| Column 6, Line 30 | Delete: "prefix a"<br>Insert: --prefix is a-- |
| Column 6, Line 44 | Delete: " $x(t) = \cos(\omega_0 t) \cdot \text{Real}\{\underline{x}(t)\} - \sin(\omega_0 t) \cdot \text{Imag}\{\underline{x}(t)\} \cos$ "<br>Insert: -- $x(t) = \cos(\omega_0 t) \cdot \text{Real}\{\underline{x}(t)\} - \sin(\omega_0 t) \cdot \text{Imag}\{\underline{x}(t)\} = \cos$ -- |
| Column 6, Line 62 | Delete: "with radio"<br>Insert: --with the radio-- |
| Column 7, Line 26 | Delete: "$Z[u]=[u]\,X[u]$"<br>Insert: --$Z[u]=H[u]X[u]$-- |
| Column 7, Line 38 | Delete: "quadratura"<br>Insert: --quadrature-- |
| Column 11, Line 22 | Delete: " $Y[k] = \mu \cdot H[k]X[k]\nu \cdot H[-k]X[-k]^*$ "<br>Insert: -- $Y[k] = \mu \cdot H[k]X[k] + \nu \cdot H[-k]^* X[-k]^*$ -- |
| Column 11, Line 25 | Delete: "distorsion"<br>Insert: --distortion-- |
| Column 11, Line 41 | Delete: "w"<br>Insert: --w*-- |
| Column 11, Line 44 | Delete: " $r\underline{r}[n] = \underline{\tilde{s}}[n] - w^* \cdot \underline{\tilde{s}}[n]^*$ "<br>Insert: -- $\underline{r}[n] = \underline{\tilde{s}}[n] - w^* \cdot \underline{\tilde{s}}[n]^*$ -- |
| Column 12, Line 19 | Delete: "compensation-block"<br>Insert: --compensation block-- |
| Column 12, Line 26 | Delete: " $\underline{r}[n] = (\mu - w^*\nu^*)\underline{s}[n] + (\nu - w^*\mu^*)\underline{s}[n]^*$ "<br>Insert: -- $\underline{r}[n] = (\mu - w^*\nu^*)\underline{s}[n] + (\nu - w^*\mu^*)\underline{s}[n]^*$ -- |
| Column 12, Line 55 | Delete: " $\hat{y}[n]=\hat{r}[n]$ "<br>Insert: -- $\underline{y}[n]=\underline{r}[n]$ -- |

CERTIFICATE OF CORRECTION (continued)

| | |
|---|---|
| Column 13, Line 52 | Delete: "envelop"<br>Insert: --envelope-- |
| Column 14, Line 24 | Delete: "$\alpha_m[k]$"<br>Insert: --$\alpha_m[k]$.-- |
| Column 14, Line 43 | Delete: "$\tilde{\underline{s}}_{aREF} \tilde{\underline{s}}_m[n]^* \cdot e^{+j\hat{\Delta}\omega t_{m,n}} \cong \mu^* \cdot \underline{s}_m[n]^* \cdot e^{+2j\Delta\omega t_{m,n}} + \nu^* \cdot \underline{s}_m[n]$"<br>Insert: -- $\tilde{\underline{s}}_{\beta PR} = \tilde{\underline{s}}_m[n] e^{+j\Delta\omega t_{m,n}} \cong \mu \cdot \underline{s}_m[n] + \nu \cdot \underline{s}_m[n]^* \cdot e^{+2j\Delta\omega t_{m,n}}$ -- |
| Column 14, Line 47 | Delete: "$\tilde{\underline{s}}_{\alpha REF} = \tilde{\underline{s}}_m[n]^* \cdot e^{+j\Delta\omega t_{m,n}} \cong \mu^* \cdot \underline{s}_m[n]^* \cdot e^{+2j\Delta\omega t_{m,n}} +$"<br>Insert: -- $\tilde{\underline{s}}_{\alpha REF} = \tilde{\underline{s}}_m[n]^* \cdot e^{+j\Delta\omega t_{m,n}} \equiv \mu^* \cdot \underline{s}_m[n]^* \cdot e^{+2j\Delta\omega t_{m,n}} +$ -- |
| Column 14, Line 56 | Delete: "transform-operation"<br>Insert: --transform operation-- |
| Column 14, Line 61 | Delete: "zero)"<br>Insert: --zero).-- |
| Column 15, Line 18 | Delete: "basically is"<br>Insert: --basically-- |
| Column 15, Line 30 | Delete: "consist"<br>Insert: --consists-- |
| Column 15, Line 44 | Delete: "$\lambda$"<br>Insert: --$\mu$-- |
| Column 15, Line 65 | Delete: "that signal"<br>Insert: --that the signal-- |
| Column 16, Line 15 | Delete: "$((\hat{Y}_m$"<br>Insert: -- $|\hat{Y}_m$ -- |
| Column 17, Line 53 | Delete: "$\cdot e_m$"<br>Insert: --$\cdot e^*_m$-- |
| Column 17, Line 64 | Delete: "arenas"<br>Insert: --are as-- |
| Column 18, Line 18 | Delete: "." |

CERTIFICATE OF CORRECTION (continued)

| | |
|---|---|
| Column 19, Line 47 | Delete: "n>2"<br>Insert: --n≥2-- |
| Column 19, Line 56 | Delete: "$e_m$"<br>Insert: --$e^*_m$-- |
| Column 19, Line 58 | Delete: "an"<br>Insert: --a-- |
| Column 19, Line 60 | Delete: " $[i]e_m[i]$ and the value $t[j]=\alpha_m[j]e_m[j]$: "<br>Insert: -- $[i]e^*_m[i]$ and the value $t[j]=\alpha_m[j]e^*_m[j]$: -- |
| Column 21, Line 41 | Delete: "an"<br>Insert: --a-- |
| Column 22, Line 19 | Delete: "(" |
| Column 22, Line 26 | Delete: "disclosed-above"<br>Insert: --disclosed above-- |
| Column 23, Line 23 | Delete: "result"<br>Insert: --results-- |
| Column 23, Line 64 | Delete: "$\sigma_{(u)}$"<br>Insert: --$\sigma^{(u)}$-- |
| Column 24, Line 2 | Delete: "see-standard"<br>Insert: --see standard-- |
| Column 24, Line 10 | Delete: " $\mu^{(u)}=v^*((\eta^{(u)*}-\mu^*)P_k^{(u)})$ "<br>Insert: -- $\xi^{(u)} = v^*\left(\left(\eta^{(u)*} - \mu^*\right)P_k^{(u)} - \mu^* P_D^{(u)}\right)$ -- |
| Column 24, Line 50 | Delete: "\|p(n)<1"<br>Insert: --\|p(n)\|<1-- |
| Column 25, Line 2 | Delete: "$\Psi_{pt}$,"<br>Insert: --$\Psi_{opt}$,-- |
| Column 28, Line 35 | Delete: "are the"<br>Insert: --are-- |